(12) United States Patent
Eyer

(10) Patent No.: US 11,051,082 B2
(45) Date of Patent: Jun. 29, 2021

(54) EXTENSIONS TO TRIGGER PARAMETERS TABLE FOR INTERACTIVE TELEVISION

(71) Applicant: Saturn Licensing LLC, New York, NY (US)

(72) Inventor: Mark Eyer, Woodinville, WA (US)

(73) Assignee: Saturn Licensing LLC, New York, NY (US)

( * ) Notice: Subject to any disclaimer, the term of this patent is extended or adjusted under 35 U.S.C. 154(b) by 120 days.

(21) Appl. No.: 16/110,640

(22) Filed: Aug. 23, 2018

(65) Prior Publication Data

US 2019/0090032 A1    Mar. 21, 2019

Related U.S. Application Data

(63) Continuation of application No. 13/915,664, filed on Jun. 12, 2013, now Pat. No. 10,104,447.
(Continued)

(51) Int. Cl.
*H04N 21/81* (2011.01)
*H04N 21/235* (2011.01)
(Continued)

(52) U.S. Cl.
CPC ..... *H04N 21/8133* (2013.01); *H04N 21/2353* (2013.01); *H04N 21/23614* (2013.01);
(Continued)

(58) Field of Classification Search
None
See application file for complete search history.

(56) References Cited

U.S. PATENT DOCUMENTS

| 5,519,443 A | 5/1996 | Salomon et al. |
| 5,543,852 A | 8/1996 | Yuen et al. |

(Continued)

FOREIGN PATENT DOCUMENTS

| CN | 1295288 A | 5/2001 |
| CN | 101218819 A | 7/2008 |

(Continued)

OTHER PUBLICATIONS

Combined Chinese Office Action and Search Report dated Apr. 21, 2015 in Chinese Patent Application No. 201280026304.4 (with English language translation).

(Continued)

*Primary Examiner* — Justin E Shepard
(74) *Attorney, Agent, or Firm* — Oblon, McClelland, Maier & Neustadt, L.L.P.

(57) ABSTRACT

A method of a reception apparatus for processing control information, reception apparatus, and non-transitory computer-readable storage medium are provided. In the method, content is received from a content source. A display is controlled to display the received content. The control information is received during the display of the received content. The control information includes location information indicating a location of application information. The application information includes an application control document. The application information is retrieved using the location information based on a change in the control information. The application control document is loaded and the display is controlled in accordance with the application control document.

15 Claims, 18 Drawing Sheets

Related U.S. Application Data

(60) Provisional application No. 61/661,738, filed on Jun. 19, 2012.

(51) Int. Cl.

| | | |
|---|---|---|
| *H04N 21/434* | (2011.01) | |
| *H04N 21/236* | (2011.01) | |
| *H04N 21/443* | (2011.01) | |
| *H04N 21/84* | (2011.01) | |
| *H04N 21/858* | (2011.01) | |
| *H04N 21/643* | (2011.01) | |
| *H04N 21/8545* | (2011.01) | |
| *H04N 21/43* | (2011.01) | |
| *H04N 21/435* | (2011.01) | |
| *H04N 21/462* | (2011.01) | |

(52) U.S. Cl.
CPC ..... *H04N 21/4307* (2013.01); *H04N 21/4345* (2013.01); *H04N 21/4348* (2013.01); *H04N 21/4351* (2013.01); *H04N 21/4431* (2013.01); *H04N 21/4622* (2013.01); *H04N 21/64322* (2013.01); *H04N 21/812* (2013.01); *H04N 21/8173* (2013.01); *H04N 21/84* (2013.01); *H04N 21/8545* (2013.01); *H04N 21/8586* (2013.01)

(56) References Cited

U.S. PATENT DOCUMENTS

| | | |
|---|---|---|
| 5,617,146 A | 4/1997 | Duffield et al. |
| 5,818,935 A | 10/1998 | Maa |
| 6,373,534 B1 | 4/2002 | Yasuki et al. |
| 6,507,369 B1 | 1/2003 | Kim |
| 6,574,795 B1 | 6/2003 | Carr |
| 6,637,032 B1 | 10/2003 | Feinleib |
| 6,766,524 B1 | 7/2004 | Matheny et al. |
| 6,824,044 B1 | 11/2004 | Lapstun et al. |
| 7,028,327 B1 | 4/2006 | Dougherty et al. |
| 7,139,813 B1 | 11/2006 | Wallenius |
| 7,185,087 B2 | 2/2007 | Gourraud |
| 7,200,674 B2 | 4/2007 | Sapuram et al. |
| 7,222,155 B1 | 5/2007 | Gebhardt et al. |
| 7,631,338 B2 | 12/2009 | Del Sesto et al. |
| 7,774,815 B1 | 8/2010 | Allen |
| 7,805,746 B2 | 9/2010 | Brandyberry et al. |
| 7,861,259 B2 | 12/2010 | Barone, Jr. |
| 7,889,964 B1 | 2/2011 | Barton et al. |
| 8,307,393 B2 | 11/2012 | Song et al. |
| 8,396,846 B2 | 3/2013 | Konik et al. |
| 8,407,743 B2 | 3/2013 | Suh et al. |
| 8,595,783 B2 | 11/2013 | Dewa |
| 8,705,933 B2 | 4/2014 | Eyer |
| 8,839,338 B2 | 9/2014 | Eyer |
| 8,842,974 B2 | 9/2014 | Kitazato |
| 8,863,171 B2 | 10/2014 | Blanchard et al. |
| 8,872,888 B2 | 10/2014 | Kitazato |
| 8,875,169 B2 | 10/2014 | Yamagishi |
| 8,875,204 B2 | 10/2014 | Kitazato |
| 8,884,800 B1 | 11/2014 | Fay |
| 8,886,009 B2 | 11/2014 | Eyer |
| 8,892,636 B2 | 11/2014 | Yamagishi |
| 8,893,210 B2 | 11/2014 | Eyer |
| 8,896,755 B2 | 11/2014 | Kitazato et al. |
| 8,898,720 B2 | 11/2014 | Eyer |
| 8,898,723 B2 | 11/2014 | Eyer |
| 8,904,417 B2 | 12/2014 | Kitahara et al. |
| 8,908,103 B2 | 12/2014 | Kitazato |
| 8,909,694 B2 | 12/2014 | Yamagishi et al. |
| 8,914,832 B2 | 12/2014 | Yamagishi |
| 8,917,358 B2 | 12/2014 | Kitazato et al. |
| 8,918,801 B2 | 12/2014 | Kitazato et al. |
| 8,930,988 B2 | 1/2015 | Kitazato et al. |
| 8,938,756 B2 | 1/2015 | Kitazato |
| 8,941,779 B2 | 1/2015 | Eyer |
| 8,966,564 B2 | 2/2015 | Kitazato |
| 8,988,612 B2 | 3/2015 | Kitazato |
| 8,989,723 B2 | 3/2015 | Coppinger et al. |
| 9,015,785 B2 | 4/2015 | Yamagishi |
| 9,038,095 B2 | 5/2015 | Fay et al. |
| 9,043,857 B2 | 5/2015 | Dewa |
| 9,078,031 B2 | 7/2015 | Kitazato et al. |
| 9,185,460 B2 | 11/2015 | Kitazato et al. |
| 2001/0003212 A1 | 6/2001 | Marler et al. |
| 2001/0046069 A1 | 11/2001 | Jones |
| 2002/0033844 A1 | 3/2002 | Levy et al. |
| 2002/0062382 A1 | 5/2002 | Rhoads et al. |
| 2002/0097235 A1 | 7/2002 | Rosenberg et al. |
| 2002/0108121 A1 | 8/2002 | Alao et al. |
| 2002/0124249 A1 | 9/2002 | Shintani et al. |
| 2002/0162120 A1 | 10/2002 | Mitchell |
| 2002/0188959 A1 | 12/2002 | Piotrowski |
| 2003/0023971 A1 | 1/2003 | Martinolich et al. |
| 2003/0033202 A1 | 2/2003 | Ogawa et al. |
| 2003/0046690 A1 | 3/2003 | Miller |
| 2003/0051253 A1 | 3/2003 | Barone, Jr. |
| 2003/0093792 A1 | 5/2003 | Labeeb et al. |
| 2003/0187798 A1 | 10/2003 | McKinley et al. |
| 2003/0195021 A1 | 10/2003 | Yamashita et al. |
| 2003/0220835 A1 | 11/2003 | Barnes, Jr. |
| 2004/0010771 A1 | 1/2004 | Wallace et al. |
| 2004/0010792 A1 | 1/2004 | Wallace et al. |
| 2004/0010793 A1 | 1/2004 | Wallace et al. |
| 2004/0032486 A1 | 2/2004 | Shusman |
| 2004/0210942 A1 | 10/2004 | Lemmons |
| 2005/0005303 A1 | 1/2005 | Barone, Jr. et al. |
| 2005/0028195 A1 | 2/2005 | Feinleib et al. |
| 2005/0071889 A1 | 3/2005 | Liang |
| 2005/0192933 A1 | 9/2005 | Rhoads et al. |
| 2005/0262539 A1 | 11/2005 | Barton et al. |
| 2006/0089933 A1 | 4/2006 | Khandelwal et al. |
| 2006/0130120 A1 | 6/2006 | Brandyberry et al. |
| 2006/0190776 A1 | 8/2006 | Oostveen et al. |
| 2006/0206452 A1 | 9/2006 | Ebbo et al. |
| 2006/0225093 A1 | 10/2006 | Huttunen et al. |
| 2007/0016653 A1 | 1/2007 | Larsen et al. |
| 2007/0022437 A1 | 1/2007 | Gerken |
| 2007/0027808 A1 | 2/2007 | Dooley, IV et al. |
| 2007/0055689 A1 | 3/2007 | Rhoads et al. |
| 2007/0124796 A1 | 5/2007 | Wittkotter |
| 2007/0136777 A1 | 6/2007 | Hasek et al. |
| 2007/0177466 A1 | 8/2007 | Ando et al. |
| 2007/0300273 A1 | 12/2007 | Turner |
| 2008/0021883 A1 | 1/2008 | Alstrin et al. |
| 2008/0049971 A1 | 2/2008 | Ramos et al. |
| 2008/0082618 A1 | 4/2008 | Jones |
| 2008/0216137 A1 | 9/2008 | Van Der Heijden |
| 2008/0275906 A1 | 11/2008 | Rhoads et al. |
| 2009/0005071 A1 | 1/2009 | Forstall et al. |
| 2009/0009661 A1 | 1/2009 | Murakami et al. |
| 2009/0034556 A1 | 2/2009 | Song et al. |
| 2009/0036193 A1 | 2/2009 | Shimono |
| 2009/0086701 A1 | 4/2009 | Lohmar et al. |
| 2009/0096610 A1 | 4/2009 | Thorn |
| 2009/0138484 A1 | 5/2009 | Ramos et al. |
| 2009/0244373 A1 | 10/2009 | Park |
| 2009/0276819 A1 | 11/2009 | Kim et al. |
| 2009/0296624 A1 | 12/2009 | Ryu et al. |
| 2009/0307741 A1 | 12/2009 | Casagrande |
| 2009/0317053 A1 | 12/2009 | Morley et al. |
| 2009/0320064 A1 | 12/2009 | Soldan et al. |
| 2009/0320073 A1 | 12/2009 | Reisman |
| 2010/0050217 A1 | 2/2010 | Suh et al. |
| 2010/0095337 A1 | 4/2010 | Dua |
| 2010/0134701 A1 | 6/2010 | Eyer |
| 2010/0146376 A1 | 6/2010 | Reams |
| 2010/0157025 A1 | 6/2010 | Suh et al. |
| 2010/0161757 A1 | 6/2010 | Suh et al. |
| 2010/0162307 A1 | 6/2010 | Suh et al. |
| 2010/0186042 A1 | 7/2010 | Roop et al. |
| 2010/0186059 A1 | 7/2010 | Suh et al. |
| 2010/0215340 A1 | 8/2010 | Pettit et al. |
| 2010/0223436 A1 | 9/2010 | Yamagishi et al. |

(56) References Cited

U.S. PATENT DOCUMENTS

| | | |
|---|---|---|
| 2010/0235537 A1 | 9/2010 | Kitazato |
| 2010/0257025 A1 | 10/2010 | Brocklebank |
| 2010/0306805 A1 | 12/2010 | Neumeier et al. |
| 2010/0309387 A1 | 12/2010 | Eyer |
| 2011/0001885 A1 | 1/2011 | Eyer |
| 2011/0004907 A1 | 1/2011 | Ryer |
| 2011/0004908 A1 | 1/2011 | Eyer |
| 2011/0004910 A1 | 1/2011 | Eyer |
| 2011/0010737 A1 | 1/2011 | Bouazizi et al. |
| 2011/0075990 A1 | 3/2011 | Eyer |
| 2011/0088075 A1 | 4/2011 | Eyer |
| 2011/0128443 A1 | 6/2011 | Blanchard et al. |
| 2011/0130172 A1* | 6/2011 | Rao ................. H04L 67/42 455/566 |
| 2011/0149036 A1 | 6/2011 | Suh et al. |
| 2011/0221863 A1 | 9/2011 | Eyer |
| 2011/0243536 A1 | 10/2011 | Eyer |
| 2011/0246488 A1 | 10/2011 | Eyer |
| 2011/0247028 A1 | 10/2011 | Eyer |
| 2011/0258659 A1 | 10/2011 | Carney et al. |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1 | 12/2011 | Blanchard et al. |
| 2011/0314496 A1 | 12/2011 | Di Mattia et al. |
| 2011/0317771 A1 | 12/2011 | Chen et al. |
| 2011/0321114 A1 | 12/2011 | Newell |
| 2012/0016876 A1 | 1/2012 | Oostveen et al. |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1 | 3/2012 | Hattori et al. |
| 2012/0066733 A1 | 3/2012 | Eyer |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084825 A1* | 4/2012 | Sharma ............. H04N 21/4351 725/109 |
| 2012/0084829 A1 | 4/2012 | Kitazato |
| 2012/0096043 A1 | 4/2012 | Stevens, Jr. |
| 2012/0174171 A1 | 7/2012 | Bouchard et al. |
| 2012/0180109 A1 | 7/2012 | Chen |
| 2012/0185888 A1 | 7/2012 | Eyer et al. |
| 2012/0189010 A1 | 7/2012 | Lee et al. |
| 2012/0216115 A1 | 8/2012 | Lorenceau |
| 2012/0216229 A1 | 8/2012 | Eyer |
| 2012/0236113 A1 | 9/2012 | Eyer |
| 2012/0253826 A1 | 10/2012 | Kitazato et al. |
| 2012/0274848 A1 | 11/2012 | Kitahara et al. |
| 2012/0275764 A1 | 11/2012 | Eyer |
| 2012/0284492 A1 | 11/2012 | Zievers |
| 2012/0291064 A1 | 11/2012 | Kitazato |
| 2012/0297436 A1 | 11/2012 | Eyer |
| 2012/0303745 A1 | 11/2012 | Lo et al. |
| 2013/0024894 A1 | 1/2013 | Eyer |
| 2013/0024897 A1 | 1/2013 | Eyer |
| 2013/0031569 A1 | 1/2013 | Eyer |
| 2013/0036440 A1 | 2/2013 | Eyer |
| 2013/0055313 A1 | 2/2013 | Eyer |
| 2013/0103716 A1 | 4/2013 | Yamagishi |
| 2013/0145414 A1 | 6/2013 | Yamagishi |
| 2013/0167171 A1 | 6/2013 | Kitazato et al. |
| 2013/0191860 A1 | 7/2013 | Kitazato et al. |
| 2013/0198768 A1 | 8/2013 | Kitazato |
| 2013/0201399 A1 | 8/2013 | Kitazato et al. |
| 2013/0205327 A1 | 8/2013 | Eyer |
| 2013/0212634 A1 | 8/2013 | Kitazato |
| 2013/0215327 A1 | 8/2013 | Kitazato et al. |
| 2013/0250173 A1 | 9/2013 | Eyer |
| 2013/0254824 A1 | 9/2013 | Eyer |
| 2013/0268987 A1 | 10/2013 | Eyer |
| 2013/0271653 A1 | 10/2013 | Kim et al. |
| 2013/0282870 A1 | 10/2013 | Dewa et al. |
| 2013/0283311 A1 | 10/2013 | Eyer |
| 2013/0283328 A1 | 10/2013 | Kitazato |
| 2013/0291022 A1 | 10/2013 | Eyer |
| 2013/0291049 A1 | 10/2013 | Kitazato |
| 2013/0340007 A1 | 12/2013 | Eyer |
| 2013/0340021 A1 | 12/2013 | Eyer |
| 2014/0013347 A1 | 1/2014 | Yamagishi |
| 2014/0013379 A1 | 1/2014 | Kitazato et al. |
| 2014/0020038 A1 | 1/2014 | Dewa |
| 2014/0020042 A1 | 1/2014 | Eyer |
| 2014/0040965 A1 | 2/2014 | Kitazato et al. |
| 2014/0040968 A1 | 2/2014 | Kitazato et al. |
| 2014/0043540 A1 | 2/2014 | Kitazato et al. |
| 2014/0047496 A1 | 2/2014 | Kim et al. |
| 2014/0053174 A1 | 2/2014 | Eyer et al. |
| 2014/0067922 A1 | 3/2014 | Yamagishi et al. |
| 2014/0075474 A1 | 3/2014 | Moreau et al. |
| 2014/0099078 A1 | 4/2014 | Kitahara et al. |
| 2014/0122528 A1 | 5/2014 | Yamagishi |
| 2014/0130077 A1 | 5/2014 | Oostveen et al. |
| 2014/0137153 A1 | 5/2014 | Fay et al. |
| 2014/0137165 A1 | 5/2014 | Yamagishi |
| 2014/0143811 A1 | 5/2014 | Lee et al. |
| 2014/0150040 A1 | 5/2014 | Kitahara et al. |
| 2014/0157304 A1 | 6/2014 | Fay et al. |
| 2014/0173661 A1 | 6/2014 | Yamagishi |
| 2014/0181858 A1 | 6/2014 | Kitazato |
| 2014/0186008 A1 | 7/2014 | Eyer |
| 2014/0201796 A1 | 7/2014 | Moon et al. |
| 2014/0208375 A1 | 7/2014 | Fay et al. |
| 2014/0208380 A1 | 7/2014 | Fay et al. |
| 2014/0229580 A1 | 8/2014 | Yamagishi |
| 2014/0229979 A1 | 8/2014 | Kitazato et al. |
| 2014/0253683 A1 | 9/2014 | Eyer et al. |
| 2014/0259052 A1 | 9/2014 | Blanchard et al. |
| 2014/0327825 A1 | 11/2014 | Eyer |
| 2014/0348448 A1 | 11/2014 | Horie et al. |
| 2014/0351877 A1 | 11/2014 | Eyer |
| 2014/0354890 A1 | 12/2014 | Eyer |
| 2015/0007215 A1 | 1/2015 | Fay et al. |
| 2015/0007219 A1 | 1/2015 | Blanchard et al. |
| 2015/0007242 A1 | 1/2015 | Fay |
| 2015/0012588 A1 | 1/2015 | Yamagishi |
| 2015/0012955 A1 | 1/2015 | Kitazato |
| 2015/0020146 A1 | 1/2015 | Eyer |
| 2015/0026730 A1 | 1/2015 | Eyer |
| 2015/0026739 A1 | 1/2015 | Eyer |
| 2015/0033280 A1 | 1/2015 | Fay |
| 2015/0038100 A1 | 2/2015 | Fay |
| 2015/0046937 A1 | 2/2015 | Kitazato et al. |
| 2015/0046942 A1 | 2/2015 | Eyer |
| 2015/0058410 A1 | 2/2015 | Yamagishi et al. |
| 2015/0058875 A1 | 2/2015 | Kitahara et al. |
| 2015/0058906 A1 | 2/2015 | Kitazato et al. |
| 2015/0058911 A1 | 2/2015 | Kitazato et al. |
| 2015/0062428 A1 | 3/2015 | Eyer |
| 2015/0067713 A1 | 3/2015 | Yamagishi |
| 2015/0074704 A1 | 3/2015 | Kitazato |
| 2015/0082367 A1 | 3/2015 | Kitazato et al. |
| 2015/0100997 A1 | 4/2015 | Kitazato |
| 2015/0121432 A1 | 4/2015 | Pandey |
| 2015/0163557 A1 | 6/2015 | Kitazato |
| 2015/0195605 A1 | 7/2015 | Eyer |
| 2015/0215673 A1 | 7/2015 | Yamagishi |

(56) References Cited

U.S. PATENT DOCUMENTS

| | | |
|---|---|---|
| 2015/0222941 A1 | 8/2015 | Fay et al. |
| 2015/0222963 A1 | 8/2015 | Dewa |

FOREIGN PATENT DOCUMENTS

| | | |
|---|---|---|
| EP | 1 085 758 A2 | 3/2001 |
| EP | 1085758 A2 | 3/2001 |
| EP | 1380945 A2 | 7/2003 |
| EP | 2755384 | 7/2014 |
| JP | 1127641 | 1/1999 |
| JP | 2003308328 | 10/2003 |
| JP | 2006245653 | 9/2006 |
| JP | 2010182323 | 8/2010 |
| KR | 10-2005-0033427 A | 4/2005 |
| KR | 10-2010-0021164 | 2/2010 |
| KR | 10-2011-0103982 A | 9/2011 |
| WO | WO 02/071760 A2 | 9/2002 |
| WO | WO2009/029278 A1 | 3/2009 |
| WO | WO 2009/134105 A2 | 11/2009 |
| WO | WO 2009/134105 A3 | 11/2009 |
| WO | WO2011066171 | 6/2011 |
| WO | WO2011074218 | 6/2011 |
| WO | WO2013012676 | 1/2013 |
| WO | WO2005006758 | 1/2015 |

OTHER PUBLICATIONS

Extended European Search Report for Application No. 12814180.1 dated Jun. 30, 2015.(5pages).
Extended European Search Report for Application No. 12814551.3 dated Jun. 22, 2015.(5pages).
Extended European Search Report for Application No. 13764907.5 dated Jul. 27, 2015.(5pages).
Extended European Search Report dated Mar. 12, 2015 in European Application No. 12829741.3.
Extended European Search Report dated Nov. 3, 2015 in Patent Application No. 13777548.2.
Extended European Search Report dated Oct. 12, 2015 in Patent Application No. 13765058.6.
International Search Report and Written Opinion dated Jun. 17, 2013 in PCT/US2013/036075 filed Apr. 11, 2013.
International Search Report and Written Opinion dated May 17, 2013 in PCT/US2013/030646 filed Mar. 13, 2013.
International Search Report and Written Opinion dated May 31, 2013 in PCT/US13/33133 filed Mar. 20, 2013.
International Search Report and Written Opinion dated Oct. 5, 2012 in PCT/US12/46454 filed Jul. 12, 2012.
Pailat. "FLUTE—File Delivery over Unidirectional Transport" Oct. 2004 Network Working Group—FRC 3926 HTT://tools.ietf.org/html/rfc3926, pp. 812.
International Search Report and Written Opinion dated Oct. 5, 2012 in PCT/US12/46663 filed Jul. 13, 2012.
International Search Report dated Sep. 25, 2012 in PCT/JP2012/071969 filed Aug. 30, 2012 with English language translation.
Office Action dated Aug. 10, 2016 in Russian Patent Application No. 2013151678 (with English translation).
Combined Chinese Office Action and Search Report dated Jun. 2, 2016 in Patent Application No. 201380001931.7 (with English language translation).
Combined Chinese Office Action and Search Report dated Apr. 5, 2017 in Patent Application No. 201380001931.7 (with English Translation).

* cited by examiner

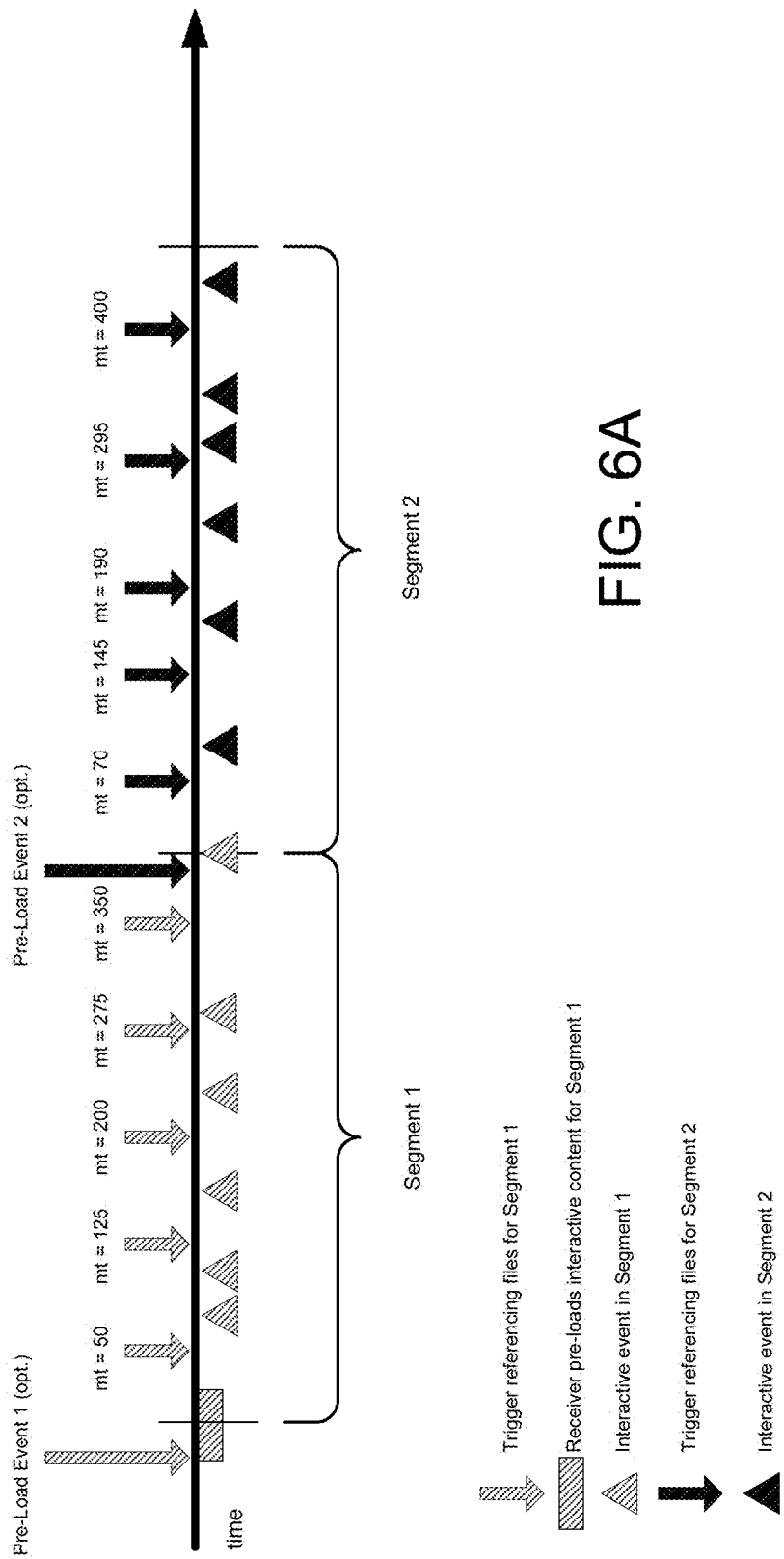

|     | b7 | b6 | b5 | b4 | b3 | b2 | b1 | b0 |     |
| --- | --- | --- | --- | --- | --- | --- | --- | --- | --- |
|     | 0 | 0 | 0 | 1 | 0 | 0 | 0 | 0 | EXT1 |
|     | 1 | 0 | 0 | 1 | 1 | 0 | 0 | 0 | 0x98 |
|     | 1 | 1 | 0 | $L_4$ | $L_3$ | $L_2$ | $L_1$ | $L_0$ |     |
|     | trigger() | | | | | | | | (variable length) |

FIG. 9B

|  | No. of bits | Format | No. of Bytes |
| --- | --- | --- | --- |
| trigger() { |  |  |  |
|     reserved | 4 | bslbf | 1 |
|     trigger_type | 4 | uimsbf | |
|     for (i=0; k<L-1; k++) { |  |  |  |
|         trigger_character | 8 | uimsbf | 1 |
|     } |  |  |  |
| } |  |  |  |

FIG. 9C

```
Trigger        = locator_part [ "?" terms ]

locator_part   = hostname "/" path_segments hostname       = *( domainlabel "." ) toplabel
domainlabel    = alphanum | alphanum *( alphanum | "-" ) alphanum
toplabel       = alpha | alpha *( alphanum | "-" ) alphanum path_segments  = segment *( "/" segment )
segment        = 1*alphanum terms          = ( event_time | media_time | others ) [ "&" spread ]
event_time     = "e=" 1*digit [ "&t=" 1*7hexdigit ]
media_time     = "m=" 1*7hexdigit
others         = other [ "&" other ]
other          = resv_cmd "=" 1*alphanum
spread         = "s=" 1*digit
      resv_cmd       = <any alphanum except "e", "E", "m", "M", "s", "S", "t", or "T"> alphanum       = alpha | digit
alpha          = lowalpha | upalpha lowalpha = "a" | "b" | "c" | "d" | "e" | "f" | "g" | "h" | "i" |
           "j" | "k" | "l" | "m" | "n" | "o" | "p" | "q" | "r" |
           "s" | "t" | "u" | "v" | "w" | "x" | "y" | "z"
upalpha  = "A" | "B" | "C" | "D" | "E" | "F" | "G" | "H" | "I" |
           "J" | "K" | "L" | "M" | "N" | "O" | "P" | "Q" | "R" |
           "S" | "T" | "U" | "V" | "W" | "X" | "Y" | "Z"
digit    = "0" | "1" | "2" | "3" | "4" | "5" | "6" | "7" |
           "8" | "9"
hexdigit = "0" | "1" | "2" | "3" | "4" | "5" | "6" | "7" |
           "8" | "9" | "a" | "b" | "c" | "d" | "e" | "f"
```

FIG. 10A

```
locator_part  = hostname "/" path_segments hostname      = *( domainlabel "." ) toplabel
domainlabel   = alphanum | alphanum *( alphanum | "-" ) alphanum
toplabel      = alpha | alpha *( alphanum | "-" ) alphanum path_segments = segment *( "/" segment )
segment       = 1*alphanum terms         = ( event_time | media_time ) [ "&" spread ]
                ["&" version ] [ "&" others ]
event_time    = "e=" 1*digit "." 1*digit [ "." 1*digit ]
                [ "&t=" 1*8hexdigit ]
media_time    = "m=" 1*8hexdigit ["&c=" 1*alphanum ]
spread        = "s=" 1*digit
version       = "v=" 1*digit
others        = other [ "&" other ]
other         = ( resv_cmd | user_cmd ) "=" 1*alphanum
resv_cmd      = <any lowalpha except "c", "e", "m", "s", "t" , or "v">
user_cmd      = <any upalpha> alphanum      = alpha | digit
alpha         = lowalpha | upalpha lowalpha = "a" | "b" | "c" | "d" | "e" | "f" | "g" | "h" | "i" |
           "j" | "k" | "l" | "m" | "n" | "o" | "p" | "q" | "r" |
           "s" | "t" | "u" | "v" | "w" | "x" | "y" | "z"
upalpha  = "A" | "B" | "C" | "D" | "E" | "F" | "G" | "H" | "I" |
           "J" | "K" | "L" | "M" | "N" | "O" | "P" | "Q" | "R" |
           "S" | "T" | "U" | "V" | "W" | "X" | "Y" | "Z"
digit    = "0" | "1" | "2" | "3" | "4" | "5" | "6" | "7" |
           "8" | "9"
hexdigit = "0" | "1" | "2" | "3" | "4" | "5" | "6" | "7" |
           "8" | "9" | "a" | "b" | "c" | "d" | "e" | "f"
```

FIG. 10B

EXTENSIONS TO TRIGGER PARAMETERS TABLE FOR INTERACTIVE TELEVISION

CROSS-REFERENCE TO RELATED APPLICATIONS

This application is a continuation of U.S. Ser. No. 13/915,664, filed Jun. 12, 2013, which is related and claims priority to U.S. provisional patent application No. 61/661,738, filed Jun. 19, 2012, which is incorporated herein by reference in its entirety. This application is also related to U.S. patent application Ser. No. 13/490,216, filed Jun. 6, 2012; U.S. provisional patent application No. 61/509,679, filed Jul. 20, 2011; U.S. provisional patent application No. 61/531,360, filed Sep. 6, 2011; U.S. provisional patent application No. 61/613,869, filed Mar. 21, 2012; U.S. provisional patent application No. 61/613,880, filed Mar. 21, 2012; and U.S. provisional patent application No. 61/636,488, filed Apr. 20, 2012, which are incorporated herein by reference in their entirety.

BACKGROUND OF THE INVENTION

Field of the Invention

Embodiments described herein relate generally to a method, computer program, reception apparatus, and information providing apparatus for trigger compaction.

Background

Modern televisions and set top boxes are capable of performing numerous functions in addition to receiving and presenting television broadcasts. Some functions include the display of an electronic programming guide (EPG), widgets that allow a television viewer to pull up web pages and tools right alongside programs being watched on a television, and the like. Many of these functions require that the television or set top box receive additional data. For example, in the case of the EPG, the television or set top box would need to receive program information.

In some cases the additional data is provided along with the television broadcast. When the additional data is provided in this manner the amount of data that can be provided is often limited. As a result, it may be necessary to reduce the amount of additional data provided along with the television broadcast or obtain the additional data from another source.

SUMMARY OF THE INVENTION

Embodiments of the present disclosure address at least the problem discussed above by providing trigger compaction using a trigger parameters table (TPT).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6A illustrates exemplary trigger timings for pre-produced content;

FIG. 9B is an exemplary format of a trigger command delivered in non-closed caption text data;

FIG. 9C illustrates an exemplary trigger syntax;

FIG. 10A is an exemplary normative syntax for a trigger; and

FIG. 10B is another exemplary normative syntax for a trigger.

DETAILED DESCRIPTION

Figure 1:
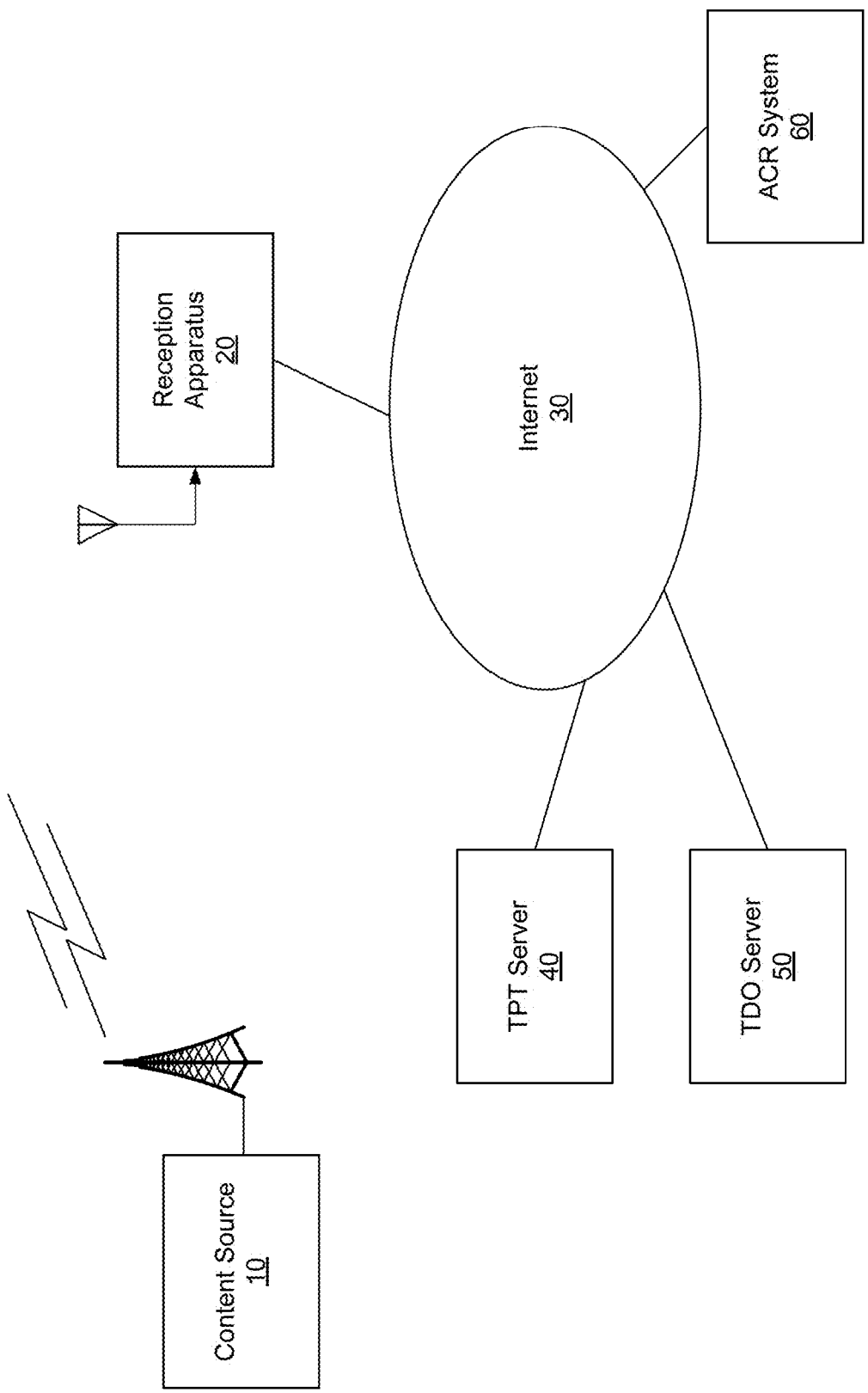
FIG. 1 illustrates an exemplary broadcast system including a content source, reception apparatus, trigger parameters table (TPT) server, triggered declarative object (TDO) server, and an automatic content recognition (ACR) system.

According to an embodiment of the present disclosure, there is provided a method of a reception apparatus for processing triggers. The method includes receiving content from a content source, and displaying the received content on a display. A first trigger is extracted from closed caption data associated with the received content. The reception apparatus retrieves a trigger parameters table (TPT) based on the extracted first trigger. The TPT includes at least one event associated with one or a combination of a trigger identifier and a first media time of the received content, and is stored in a memory of the reception apparatus. Further, the reception apparatus processes the event based on one or a combination of a second trigger including the trigger identifier and the first media time equaling a current media time of the received content.

According to another embodiment of the method, the step of receiving content includes receiving the content via at least one of a satellite broadcast, a cable television transmission, a terrestrial television broadcast, and the Internet.

According to another embodiment of the method, the step of retrieving the TPT includes processing a Program Map Table (PMT) of a broadcast virtual channel associated with the received content. processing a Service Signaling Channel (SSC) to retrieve a Service Map Table (SMT), discovering coordinates of a File Delivery over Unidirectional Transport (FLUTE) session, acquiring a FLUTE File Delivery Table (FDT), comparing a locator-part of the first trigger against Content-Location values in the FLUTE FDT until a match is found, and retrieving the TPT based on the matched Content-Location value.

According to another embodiment of the method, the step of retrieving the TPT includes performing an Internet http GET using a locator-part of the first trigger.

According to another embodiment of the method, the step of extracting the first trigger includes extracting the first trigger from non-closed caption text data within a service block having a service number in the range of 1-6.

According to another embodiment of the method, the step of extracting the first trigger includes extracting the first trigger from non-closed caption text data within a service block having a service number of 6.

According to another embodiment of the method, the method further includes extracting the second trigger, including a second media time, from the closed caption data associated with the received content, and determining the current media time based on the second media time.

According to another embodiment of the method, the method further includes extracting the second trigger indicating that the event is to be retimed to a second media time from the closed caption data associated with the received content, and associating the event included in the TPT stored in the memory with the second media time.

According to another embodiment of the method, the method further includes extracting the second trigger from the closed caption data associated with the received content. The second trigger indicates immediate execution of the event associated with the trigger id. Further, the step of processing includes immediately processing the event associated with the trigger id.

Further, according to an embodiment of the present disclosure, there is provided a computer-readable storage medium having instructions embedded therein, which, when executed by a computer, cause the computer to perform the method of the reception apparatus, as discussed above.

According to an embodiment of the present disclosure, there is provided a reception apparatus. The reception apparatus includes a receiver, a display interface, an extraction unit, and a processor. The receiver is configured to receive content from a content source. The display interface is configured to display the received content. The extraction unit is configured to extract a first trigger from closed caption data associated with the received content. The processor is configured to retrieve a TPT based on the extracted first trigger. The TPT includes at least one event associated with one or a combination of a trigger identifier and a first media time of the received content. Further, the processor is configured to store the TPT in a memory of the reception apparatus, and process the event based on one or a combination of a second trigger including the trigger identifier and the first media time equaling a current media time of the received content.

According to another embodiment of the reception apparatus, the receiver is configured to receive the content via at least one of a satellite broadcast, a cable television transmission, a terrestrial television broadcast, and the Internet.

According to another embodiment of the reception apparatus, the processor is configured to process a PMT of a broadcast virtual channel associated with the received content, process an SSC to retrieve an SMT, discover coordinates of a FLUTE session, acquire an FDT, compare a locator-part of the first trigger against Content-Location values in the FLUTE FDT until a match is found, and retrieve the TPT based on the matched Content-Location value.

According to another embodiment of the reception apparatus, the processor is configured to perform an Internet http GET using a locator-part of the first trigger to retrieve the TPT.

According to another embodiment of the reception apparatus, the extraction unit is configured to extract the first trigger from non-closed caption text data within a service block having a service number in the range of 1-6.

According to another embodiment of the reception apparatus, the extraction unit is configured to extract the first trigger from non-closed caption text data within a service block having a service number of 6.

According to another embodiment of the reception apparatus, the extraction unit is configured to extract the second trigger including a second media time from the closed caption data associated with the received content. The processor is configured to determine the current media time based on the second media time.

According to another embodiment of the reception apparatus, the extraction unit is configured to extract the second trigger indicating that the event is to be retimed to a second media time from the closed caption data associated with the received content. The processor is configured to associate the event included in the TPT stored in the memory with the second media time in response to the second trigger.

According to another embodiment of the reception apparatus, the extraction unit is configured to extract the second trigger from the closed caption data associated with the received content. The second trigger indicates immediate execution of the event associated with the trigger id. The processor is configured to immediately process the event associated with the trigger id in response to the second trigger.

According to an embodiment of the present disclosure, there is provided an information providing apparatus, which includes a memory and a communication unit. The memory is configured to store a TPT. The TPT includes at least one event associated with one or a combination of a trigger identifier and a media time of content to be provided to a reception apparatus. The communication unit is configured to provide the TPT to the reception apparatus. The TPT is provided at a location identified in a trigger included within closed caption data associated with the content provided to the reception apparatus.

According to an embodiment of the present disclosure, there is provided a method of a reception apparatus for processing triggers. The method includes receiving content from a content source, and displaying the received content on a display. The reception apparatus 20 receives a first trigger associated with the received content. The reception apparatus retrieves a TPT based on the first trigger. The TPT includes at least one event associated with one or a combination of a trigger identifier and a first media time of the received content, and is stored in a memory of the reception apparatus. Further, the reception apparatus determines whether to process the at least one event included in the TPT based on one or a combination of a protocol version and one or more capabilities defined in the TPT.

According to another embodiment of the method, the step of receiving content includes receiving the content via at least one of a satellite broadcast, a cable television transmission, a terrestrial television broadcast, and the Internet.

According to another embodiment of the method, the step of retrieving the TPT includes processing a PMT of a broadcast virtual channel associated with the received content, processing an SSC to retrieve an SMT, discovering coordinates of a FLUTE session, acquiring an FDT, comparing a locator-part of the first trigger against Content-Location values in the FLUTE FDT until a match is found, and retrieving the TPT based on the matched Content-Location value.

According to another embodiment of the method, the step of retrieving the TPT includes performing an Internet http GET using a locator-part of the first trigger.

According to another embodiment of the method, the method further includes computing a random time period based on a diffusion attribute included in the TPT, and retrieving supplemental content referenced in the TPT after the computed random time period.

According to another embodiment of the method, the method further includes retrieving a second trigger indicating that the event is to be retimed to a second media time from a server identified in the TPT, and associating the event included in the TPT stored in the memory with the second media time.

Further, according to an embodiment of the present disclosure, there is provided a computer-readable storage medium having instructions embedded therein, which, when executed by a computer, cause the computer to perform the method of the reception apparatus, as discussed above.

According to an embodiment of the present disclosure, there is provided a reception apparatus. The reception apparatus includes a receiver, a display interface, and a processor. The receiver is configured to receive content from a content source. The display interface is configured to display the received content. The processor is configured to receive a first trigger associated with the received content. The processor is configured to retrieve a TPT based on the first trigger. The TPT includes at least one event associated with one or a combination of a trigger identifier and a first media time of the received content. Further, the processor is configured to store the TPT in a memory of the reception apparatus, and determine whether to process the at least one event included in the TPT based on one or a combination of a protocol version and one or more capabilities defined in the TPT.

According to another embodiment of the present disclosure, the receiver is configured to receive the content via at least one of a satellite broadcast, a cable television transmission, a terrestrial television broadcast, and the Internet.

According to another embodiment of the present disclosure, the processor is configured to process a PMT of a broadcast virtual channel associated with the received content, process an SSC to retrieve an SMT, discover coordinates of a FLUTE session, acquire an FDT, compare a locator-part of the first trigger against Content-Location values in the FLUTE FDT until a match is found, and retrieve the TPT based on the matched Content-Location value.

According to another embodiment of the present disclosure, the processor is configured to perform an Internet http GET using a locator-part of the first trigger to retrieve the TPT.

According to another embodiment of the present disclosure, the processor is configured to compute a random time period based on a diffusion attribute included in the TPT, and retrieve supplemental content referenced in the TPT after the computed random time period.

According to another embodiment of the present disclosure, the processor is configured to retrieve a second trigger indicating that the event is to be retimed to a second media time from a server identified in the TPT, and associate the event included in the TPT stored in the memory with the second media time.

According to an embodiment of the present disclosure, there is provided an information providing apparatus, which includes a memory and a communication unit. The memory is configured to store a TPT. The TPT includes at least one event associated with one or a combination of a trigger identifier and a media time of content to be provided to a reception apparatus. The communication unit is configured to provide the TPT to the reception apparatus, which determines whether to process the at least one event included in the TPT based on one or a combination of a protocol version and one or more capabilities defined in the TPT.

While the disclosure is susceptible of embodiment in many different forms, there is shown in the drawings and will herein be described in detail specific embodiments, with the understanding that the present disclosure of such embodiments is to be considered as an example of the principles and not intended to limit the disclosure to the specific embodiments shown and described. In the description below, like reference numerals are used to describe the same, similar or corresponding parts in the several views of the drawings.

In interactive television applications, viewers are offered extra (i.e., supplemental) content, in addition to the program audio and video, that allows them to interact with the programming in some way. The extra content could be as simple as an Internet uniform resource locator (URL) that points to a website that can provide further information about the program, item, or service being shown. Or, an interactive element could provide text and/or graphics that augment the program video. An example of the latter is an element that displays a particular player's updated statistics during the course of a sporting event.

Often, the behavior or appearance/disappearance of these interactive elements is dependent on the timing of events within the program. Television receivers which are rendering these objects must be able to receive the appropriate signaling to know how and when to make the adjustments to the display of the interactive elements. The objects which perform this signaling function may be called "triggers" because they act to trigger a certain operation at the designated time. The varieties of operations that may be triggered are endless. Simple examples include such things as "execute" (start the operation of the interactive function), "hide" (remove all visible elements from the display), perform some designated action such as display or update some text or graphic, and "terminate" (end all operations and release memory resources).

The trigger itself must be transported from the point in the distribution chain at which the interactive element is sourced and operated all the way to the consumer's receiver. A variety of transport methods are possible for the trigger object. The trigger can be included in the digital transport multiplex in a variety of different locations, or it can be provided by an Internet-based server and accessed by receivers that are Internet-connected. Possible locations in the digital transport include in video or audio "user data," within the closed captioning transport (as described below in further detail), within a descriptor carried in a program specific information (PSI) table, within adaptation fields of the MPEG-2 Transport Stream packet, embedded in audio, and modulated within the video itself in luminance or chrominance.

In each case, smaller triggers are preferable. E.g. a trigger that can be represented in as few as 30 bytes (or characters of text) offers greater flexibility in transport and greater efficiency compared to one whose size might be 100 or more bytes. In embodiments of the present disclosure, a method for providing interactivity is described in which the trigger function is accomplished using a small or "compact" trigger.

Referring now to the drawings, FIG. 1 is a block diagram that shows an exemplary broadcast system 2, including a content source 10, a reception apparatus 20 (e.g., a digital television receiver device), a trigger parameters table (TPT) server 40, a triggered declarative object (TDO) server 50, and an optional automatic content recognition (ACR) system 60. The reception apparatus 20 accesses the TPT server 40, TDO server 60, and/or ACR system 60 via one or more communication networks such as the Internet 30. In other embodiments, TPTs stored in the TPT server 40 and/or the TDOs stored in the TDO server 60 are provided to the reception apparatus 20 by the content source 10 or the ACR system 60.

The broadcast system 2 provides an interactive digital television feature whereby a viewer is presented with supplemental content that is associated with, and synchronized in time to events within, content provided by the content source 10. The supplemental content includes one or a combination of media types such as audio, video, text, or an image, and/or one or more interactive elements. In one embodiment, the behavior and appearance of the supplemental content is associated with, and synchronized in time to the events within, the content.

In one embodiment, the content source 10 provides content to the reception apparatus 20 via a terrestrial broadcast. In other embodiments, the content source 10 provides the content via at least one of a satellite broadcast, a cable television transmission, a terrestrial television broadcast, cellular network, and data communication network such as a local area network (LAN), wide area network (WAN), or the Internet 30. The content provided by the content source 10 includes one or more television programs, without regard to whether the content is a movie, sporting event, segment of a multi-part series, news broadcast, etc. Further, the content provided by the content source 10 may also include advertisements, infomercials, and other program-like content which may not be reported as a program in an EPG.

Figure 3:
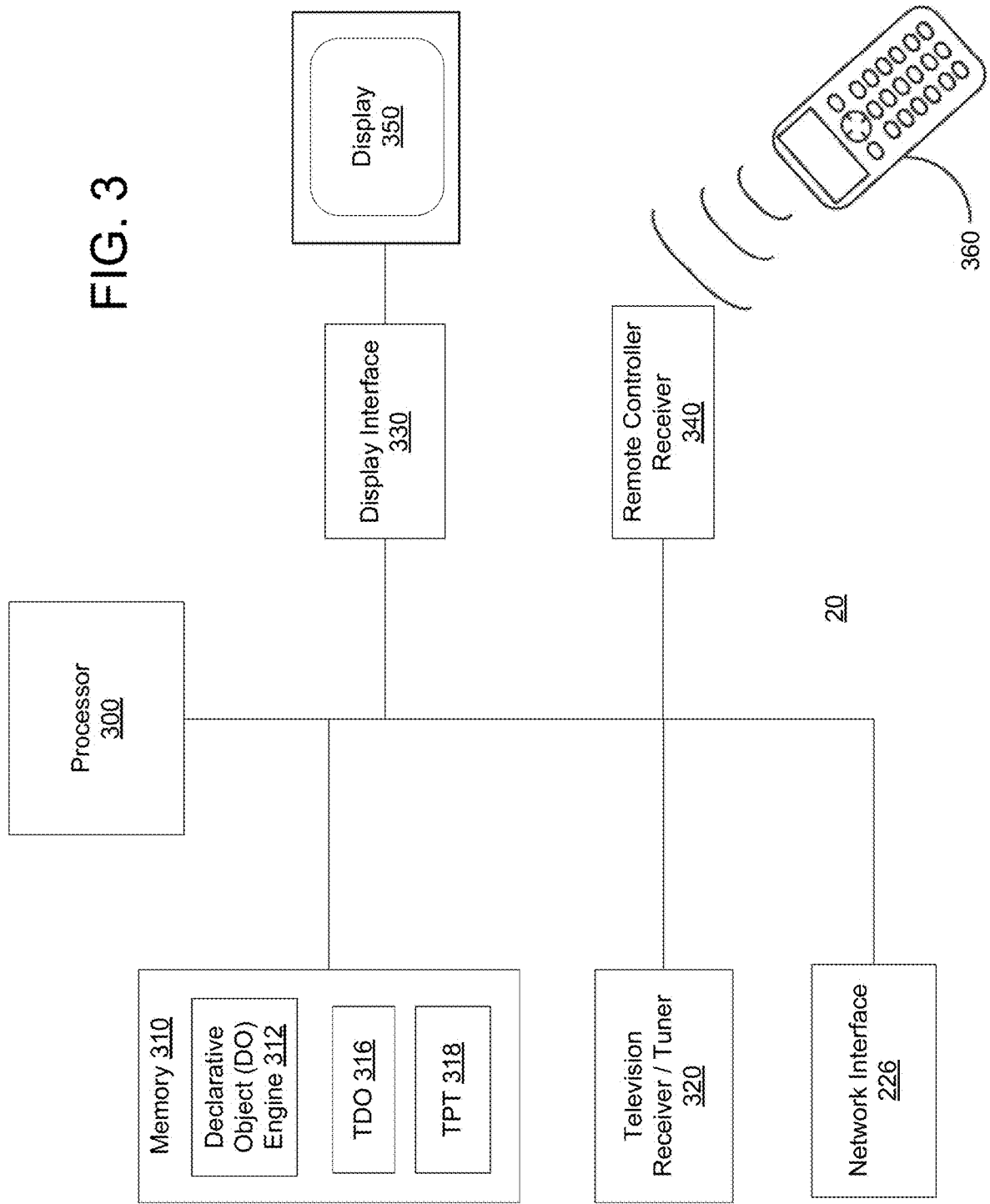
FIG. 3 is a processor-centric block diagram of an exemplary reception apparatus.

The reception apparatus 20 receives the content provided by the content source 10 and displays the content on a display 350, illustrated in FIG. 3. In one embodiment, the display 350 is an integral part of the reception apparatus 20 such as a television set. Alternatively, the display 350 may be external to the reception apparatus 20 such as a television set connected to a set top box.

According to one embodiment, the reception apparatus 20 includes a Declarative Object (DO) Engine that accepts declarative objects (DOs) and renders them along with the content (e.g., audio/video content of a program) received from the content source 10. The DO Engine renders a DO in response to a specific request from a user or in response to a trigger event. A DO that is rendered in response to a trigger event is referred to as a triggered declarative object (TDO).

The TDO is a downloadable software object created by a content provider, content creator, or service provider, which includes declarative content (e.g., text, graphics, descriptive markup, scripts, and/or audio) whose function is tied in some way to the content it accompanies. An embodiment of the TDO is described in U.S. application Ser. No. 12/959, 529 filed Dec. 3, 2010 entitled "Announcement of Triggered Declarative Objects" to Blanchard et al. which is hereby incorporated by reference in its entirety. However, the TDO is not limited to the structure described in Blanchard et al. since many attributes defined therein as being a part of a TDO could be situated in a trigger or vice versa or not present at all depending upon the function and triggering of a particular TDO.

The TDO is generally considered as "declarative" content to distinguish it from "executable" content such as a Java applet or an application that runs on an operating system platform. Although the TDO is usually considered to be a declarative object, a TDO player (e.g., the DO Engine) supports a scripting language that is an object-oriented programming language. The TDOs, in examples shown herein, are received from a content or service provider in advance of the time they are executed so that the TDO is available when needed. Moreover, an explicit trigger signal may not be necessary and a TDO may be self-triggering or triggered by some action other than receipt of a trigger signal. Various standards bodies may define associated behaviors, appearances, trigger actions, and transport methods for content and metadata for a TDO. Additionally, requirements regarding timing accuracy of TDO behaviors relative to audio/video may be defined by standards bodies.

The trigger is a data object, which is optionally bound to a particular item of content (e.g., a television program) that references a specific TDO instance or a TPT, by the use of a file name or identifier for an object that is to be downloaded (e.g., when instructing download of the TDO or TPT) or has already been downloaded (e.g., when instructing execution, suspension, termination, etc. of the TDO or based on the TPT). Certain TDOs will only make sense in conjunction with certain content. An example is a TDO that collects viewer response data, such as voting on a game show or contest.

In one embodiment, the DO Engine receives triggers tied to coincide with various points (e.g., trigger events) in the content such as a scene change or the beginning or ending of an ad segment. The triggers are divided into two types: (1) those that are processed by the DO Engine, and (2) those that are passed by the DO Engine to the TDO for processing. The triggers associated with a type 1 command are associated with, for example, commands to be executed by the DO Engine. The triggers associated with a type 2 command are associated, for example, with parameters (e.g., commands, data, etc.) to be processed within the DO itself to effect changes in appearance, behavior, or state of associated supplemental content.

A trigger may be transported within a broadcast emission stream as described, for example, in U.S. patent application Ser. No. 13/216,375, which is incorporated herein by reference in its entirety. For example, a trigger may be transported in a Packetized Elementary Stream (PES) in an MPEG-2 Transport Stream (TS), or within the DTV closed caption stream, as described in U.S. provisional application No. 61/613,869, filed Mar. 21, 2012. In other embodiments, the trigger is embedded in the content itself. For example, the trigger may be embedded in an audio or a video portion of the content and recovered by processing of the decoded audio or the video in the reception apparatus 20.

For some methods of transporting the trigger, smaller sized objects are preferred. In such a case, the trigger should be able to be represented within a small number of bits or bytes. Further, some transport methods may limit the maximum size of the trigger to a fixed number of bytes such as in the case of using the DTV Closed Caption Channel.

In one embodiment, when a trigger is transported within the broadcast emission stream, the trigger is delivered in the DTV Closed Caption Channel, in Standard caption service #6, in a command called "URL String", as a URI_type=0 URL (Interactive TV Trigger). Based on the size of the trigger, the trigger may be segmented into a plurality of segments. In one embodiment, when the trigger is separated into a plurality of segments, each segment is associated with a type that indicates whether the respective segment is (1) the first of two or more; (2) neither the first nor the last; (3) the last; and (4) the one-and-only. Any predefined values may be used to identify the type of a particular segment. Further, in one embodiment, the type information defines the sequential order of the segments. In other embodiments, the type information may be used to convey any information about the segments to allow the reception apparatus 20 to reconstruct the trigger.

For example, if the trigger is less than or equal to 26 characters in length, it is sent non-segmented (e.g., Type=11). If the trigger is 27 to 52 characters in length, it is sent in two segments (the first segment in a Type=00 segment and the second segment in a Type=10 segment). However, in other embodiments, any other criteria can be used to determine how the trigger should be segmented. Further, other service numbers may be used in addition, or as an alternative, to using service number 6. The trigger type is included in the trigger syntax illustrated in FIG. 9C.

Figure 9A:
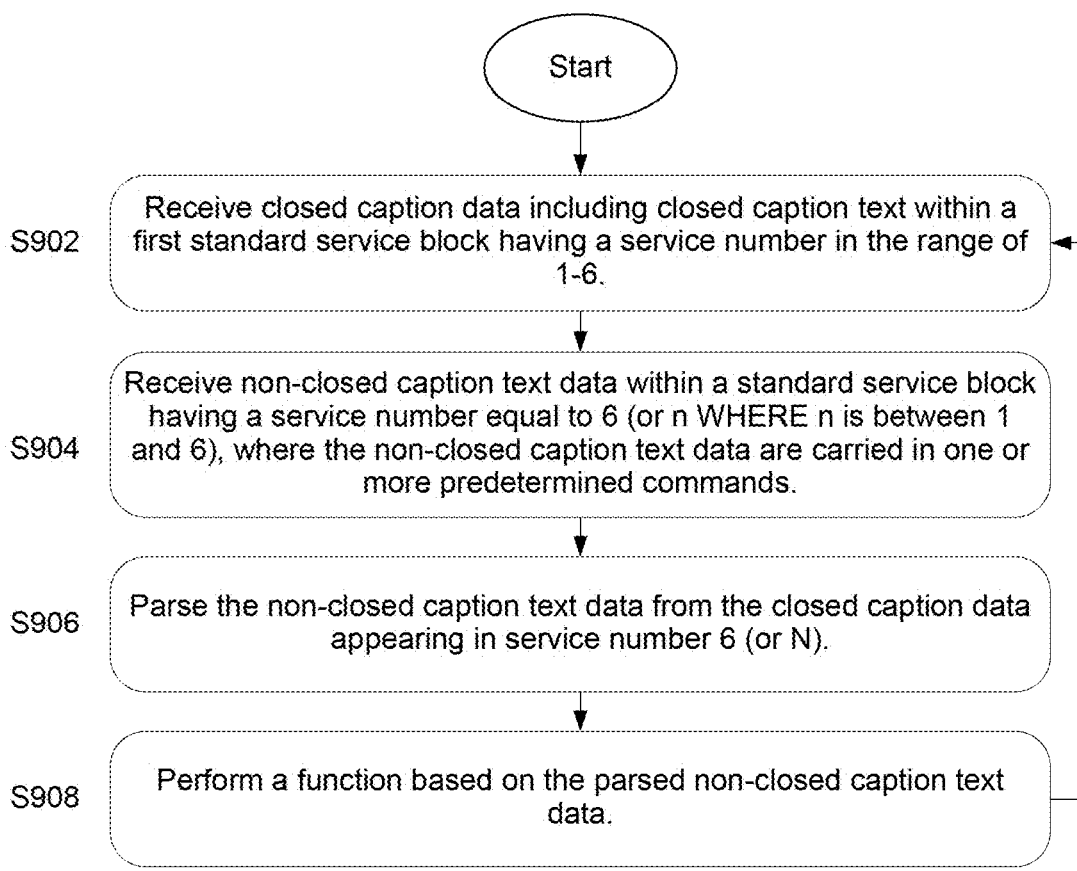
FIG. 9A is an exemplary method for processing non-closed caption text data.

FIG. 9A illustrates an exemplary process performed by the reception apparatus 20 when the trigger is delivered via the DTV Closed Caption channel. The reception apparatus 20 has access to such a trigger when, for example, it has access to the MPEG-2 Transport Stream, a portion of the full broadcast multiplex, or the content in compressed form. The process begins at S902 where closed caption data including closed caption text is received within a first Standard service block having a pre-determined service number in the range of 1-6. At S904, non-closed caption text data are received within a Standard service block having a service number equal to the pre-determined number. In general, the Standard service used for the non-closed caption text data could be any one or a combination of service numbers n between 1 and 6, but since it is relatively rare for more than the first few of the service numbers to be used for caption text data, service number 6 is used in one embodiment.

At step S906, the reception apparatus 20 parses (e.g., in a parsing computer process module) the non-closed caption text data from the closed caption data appearing in service number 6 (or n). The non-closed caption text data are then processed at step S908 (e.g., in another processor operation) to extract the trigger and perform a function based on the trigger. In one embodiment, the above-referenced non-closed caption text data are carried in a CEA-708 compliant variable length command. However, in other embodiments, the non-closed caption text data are carried in a CEA-708 fixed length command or a combination of variable and fixed length commands.

It should be noted that the DTV Closed Caption channel may also carry other types of data as an alternative or in addition to the trigger (e.g., a data stream including one or more parameters suitable for ingestion and processing by one or more TDOs, disparity data used in rendering a graphical object such as a caption window and its associated text for 3D content, etc.). These other types of data may be provided via one or more Standard service blocks having pre-determined number(s) different from the Standard service block carrying the trigger (e.g., Service #5, 4, or 3) or utilize different predetermined command code sequences in the same Standard service block as the trigger.

In one embodiment, the triggers are delivered using one of the unused code points, e.g., 0x98 in the CEA-708 C3 code space to deliver a variable-length short trigger. See FIG. 9B for an example specification in the format of a CEA standard (e.g. as an extension to CEA-708). The trigger is a variable-length command delivered in, for example, the C3 code set as defined in CEA-708.

The trigger command illustrated in FIG. 9B provides for the transport of interactive TV trigger data. As described above, in one embodiment, the trigger command is transported in standard caption Service #6. In the command coding above, the Length (L) is an unsigned integer that indicates the number of bytes following the header, in the range 11 to 27.

As specified in CEA-708-D Section 7.1.11.2, variable-length commands are indicated by the EXT1 character followed by a number in the range 0x90 to 0x9F, where the "0x" notation denotes a number represented in hexadecimal format. In the command format depicted in FIG. 9B, the EXT1 character (0x10) is followed by 0x98. In this context, 0x98 is the command identifier for the trigger command. However, any other unused command identifier can be associated with the trigger command. In accordance with the syntax defined in CEA-708-D Section 7.1.11.2, the next byte contains a two-bit Type field, a zero bit, followed by a 5-bit length field.

In one embodiment, the trigger( ) data structure follows the byte containing the length field. The syntax of one example of the trigger data is depicted in FIG. 9C in pseudo code. In the exemplary trigger syntax of FIG. 9C, trigger_type is a 4-bit unsigned integer that indicates the type of trigger to follow. In one embodiment, only type 0 triggers are defined. Accordingly, the value of trigger_type is set to 0. The reception apparatus 20 is expected to disregard instances of the trigger command indicating triggers of any other (unrecognized) type. In another embodiment, trigger_type is set to one value to indicate an Interactive TV trigger and another value to indicate that the URL is the Internet server location used for service usage reporting.

Further, in one embodiment, trigger_character is an 8-bit ASCII character whose value is restricted to those allowed for Uniform Resource Identifiers (URIs) by RFC 2396. The character string formed by trigger( ) is a valid URI per RFC 2396, which is incorporated by reference in its entirety.

Use of a variable-length DTV closed caption command in Service #6 to transport the trigger provides: (1) robust (explicit) signaling of the presence of the trigger; (2) signaling of the type of trigger (for future expansion); (3) a transport format that is a natural extension to the existing CEA-708 DTV CC protocol; and (4) a transport method that is transparent to legacy receivers.

A trigger may also be transported via other paths such as the Internet. In one embodiment, when the trigger is not available via the broadcast emission stream, the reception apparatus 20 acquires the trigger via the ACR system 60 by, for example, sending A/V samples of the content being received by the reception apparatus 20 to the ACR system 60.

When the reception apparatus 20 has no access to either the broadcast TS or broadcast triggers, in one embodiment, the reception apparatus 20 identifies the content being watched and the Media Time by means of the ACR system 60. In this case, the TPT and associated files are retrieved from the Internet server (e.g., TPT server 40) identified by the trigger as usual. However, in one embodiment, the ACR system 60 will not be responsible for offering updated triggers, to for example establish the timing for live events. Instead, updated triggers will be distributed from the TPT server 40 identified by a locator_part of the trigger, as described below. In other embodiments, the updated triggers may be provided by the ACR system 60, for example, when the ACR system 60 and TPT server 40 are combined into a single system.

In the ACR case, the reception apparatus 20 is expected to perform an access to the TPT server 40 to open a channel over which updated triggers may be received. For example, the protocols for trigger refresh may conform to the Long Polling methods defined in RFC 6202, which is incorporated herein by reference in its entirety.

Embodiments of the present disclosure provide some approaches to a system design in which the trigger itself can be represented within a small number of bytes, in order to facilitate convenient and robust transport. The representation of the trigger in a small number of bytes addresses issues such as a need for small, compact, and robust triggers for transport methods with limited data carrying capacity; and a need to accommodate variable-sized payloads, which are often awkward to transport. Some embodiments of the present disclosure also address the desire to offer a flexible system in which the TDO can be "table-driven" (e.g., its actions and behavior are specified by data in an associated table, rather than being coded into the TDO itself). This allows a single TDO script to be usable in a variety of situations.

A motivation behind the concept of triggers is that the files that make up a TDO and the data files to be used by the TDO to take some action take some amount of time to transmit to the reception apparatus 20, given their size. While the user experience of the interactive elements can be authored prior to the broadcast of the content, certain behaviors must be carefully timed to coincide with events in the program itself, for example the occurrence of a commercial advertising segment. The broadcast system 2 separates the delivery of declarative objects and associated data, scripts, text and graphics from the signaling of the specific timing of the playout of interactive events (i.e., the trigger).

The triggers perform various timing-related signaling functions in support of interactive services. Triggers are multi-functional; depending on their structure, exemplary trigger instances can perform one or more of the following functions:

Signal the location of a file directory (accessible via a File Delivery over Unidirectional Transport (FLUTE) session in the emission stream, via an Internet server, or both) containing interactive elements, for example TPTs, TDOs, graphics, and data files;

Indicate that interactive content for an upcoming program segment is available to be pre-loaded;

Indicate the current Media Time of associated audio/video or audio-only content;

Reference a particular interactive event in a TPT and signal that the event is to be executed now or at a specified future Media Time;

Indicate that accesses to an Internet server are to be spread out randomly over a specified time interval in order to avoid a peak in demand.

An exemplary normative syntax for the trigger is illustrated in FIG. 10A. This Trigger syntax is based on the absolute URI per RFC 3986, which is incorporated herein by reference in its entirety, excluding the <scheme> and "://" portion, with additional restrictions as specified below. FIG. 10B illustrates another exemplary normative syntax for the trigger.

The syntactic definition illustrated in FIG. 10A is described using the Augmented Backus-Naur Form (ABNF) grammar defined in RFC 5234, which is incorporated herein by reference in its entirety, except that the vertical bar symbol "|" is used to designate alternatives. Rules are separated from definitions by an equal "=", indentation is used to continue a rule definition over more than one line, literals are quoted with " ", parentheses "("and")" are used to group elements, optional elements are enclosed in "[" and "]" brackets, and elements may be preceded with <n>* to designate n or more repetitions of the following element; n defaults to 0.

In one embodiment, additional constraints include: (1) the maximum length of the trigger does not exceed 52 bytes; and (2) the host name portion of the Trigger is a registered Internet domain name. The maximum length of 52 bytes is set in the embodiment in which the trigger is transmitted via the DTV Closed Caption Channel in Service Channel #6, as described above. However, different maximum lengths can be set if the trigger is transmitted via other portions of the DTV Closed Caption Channel or other transport methods.

In some embodiments, the trigger is considered to consist of three parts, two being required and the third being optional: <domain name part>/<directory path>[?<parameters>].

The <domain name part> references a registered Internet domain name. The <directory path> is an arbitrary character string identifying a directory path under the control and management of the entity who owns rights to the identified domain name. The combination of <domain name part> and <directory path> uniquely identify a set of files that can be processed by the reception apparatus 20 to add interactivity to the associated content.

The <parameters> portion of the Trigger is optional. When present, it can convey one or more parameters associated with the trigger. In one embodiment, the trigger carries parameters within a query string (e.g., the portion of the trigger to the right of the "?"). Defined formats for the query string include, for example, (1) <event time>, optionally followed by <spread>; (2)<media time>, optionally followed by <spread>; (3)<other>, optionally followed by <spread>; and (4) <spread>.

In one embodiment, the parameters are formatted according to the following rules:

<event time>—two parameters, a trigger event ID designated by "e=" followed by a decimal number referencing the event ID in the associated TPT, and a timing value designated by "&t=" followed by a string 1 to 7 characters in length representing a hexadecimal number indicating a new media timing for the designated trigger event.

<media time>—a term designated by "m=" followed by a character string of 1 to 7 characters in length representing hexadecimal number indicating the current Media Time in units of milliseconds.

<spread>—a term designated by "s=" when it is the only term, or "&s=" when appended to other terms, with a character string of 1 to 3 characters in length representing a decimal number indicating the number of seconds of time over which all receivers, including the reception apparatus 20, should attempt to access the Internet server identified in the trigger. Each individual reception apparatus 20 is expected to derive a random time within the designated interval and delay the access request by that amount, thereby spreading in time the peak in demand that might otherwise occur at the first appearance of a trigger at the reception apparatus 20.

<other>—a term designated by a character other than "e", "E", "m", "M", "s", "S", "t", or "T", followed by the equals-sign and an alphanumeric string. A second <other> term may appear after the first; if present, the beginning of the second term is delimited with the "&" character. Each reception apparatus 20 is expected to disregard unrecognized terms.

Examples of valid Triggers and their functions are given in Table 1 below:

TABLE 1

Example Triggers and Functions

| Example Trigger | Function |
|---|---|
| xbc.tv/e12 | Pre-load interactive content (or TPT) from identified directory/location (online at http://xbc.tv/e12 or within associated FLUTE session). |
| xbc.tv/e12?s=10 | Pre-load interactive content (or TPT) from identified directory/location (online at http://xbc.tv/e12 or within associated FLUTE session), with smoothing parameter value 10 seconds. |
| xbc.tv/e12?m=5a33 | Identify the location of interactive content (or TPT) and establish the current Media Time of the associated content. |
| xbc.tv/e12?e=7 | Identify the location of interactive content (or TPT) and signal the immediate execution of the TPT interactive event associated with trigger_ID (or eventID) value 7. |
| xbc.tv/e12?e=8&t=77ee | Identify the location of interactive content (or TPT) and signal the execution of the TPT interactive event associated with trigger_ID (eventID) value 8 at Media Time 77ee. |
| xbc.tv/e12?m=5a33&s=12 | Identify the location of interactive content (or TPT) and establish the current Media Time of the associated content, with smoothing parameter value 12 seconds. |

Query terms other than those defined above ("e", "m", "s", and "t") may appear in a trigger to define one or more other predetermined functions. Accordingly, in one embodiment, the following triggers are legal and each reception apparatus 20 is expected to process them accordingly:

a.xbc.tv/77?a=6EE43f. Reception apparatus 20 can use as a pre-load, but disregard the "a" term if it is not recognized.

a.xbc.tv/133-Ar4?w=3&s=10. Reception apparatus 20 can use as a pre-load with spreading parameter 10, and disregard the "w" term if it is not recognized.

x.tv/E7?B=OK&C=OK&S=10. Reception apparatus 20 can use as a pre-load with spreading parameter 10, and disregard the "B" and "C" commands if they are not recognized. Note that depending on the embodiment, the query term identifier may or may not be case-insensitive.

When the TPT is specified as an XML Schema, an exemplary namespace for this schema is http://www.atsc.org/XMLSchemas/tpt/2012/1 indicating that it is major version 1 of the schema. In one embodiment, the "schema" element of the XML schema includes a "version" attribute set to the value 1.0, indicating that the minor version number of the schema is 0.

In order to provide flexibility for future changes in the schema, decoders (e.g., reception apparatus 20) of TPT instance documents with the namespace defined above should follow the "must ignore" rule. That is, they should ignore any elements or attributes they do not recognize, rather than treating them as errors.

An embodiment of the TPT structure is illustrated in the Table 2 below. Items preceded by "@" are attributes; others are elements.

TABLE 2

TPT Structure

| Element/Attribute (with @) | No. permitted | Description & Value |
|---|---|---|
| tpt | | |
| @id | 1 | domain_name/Program_id = segment id |
| @tptType | 1 | "static"|"dynamic" |
| @majorVersion | 1 | Interactive protocol major version number |
| @minorVersion | 0 . . . 1 | Interactive protocol minor version number |
| @tptVersion | 1 | Version of this TPT instance |
| @updatingTime | 0 . . . 1 | Recommended TPT polling interval (only for type = "dynamic") |
| @beginMt | 0 . . . 1 | The beginning time of the TPT scope |
| @endMt | 0 . . . 1 | The end time of the TPT scope |
| @expireDate | 0 . . . 1 | Expire date for caching TPT document. (only for type = "static") |
| liveTrigger | 0 . . . 1 | optional specification of server providing live Triggers |
| @liveTriggerURL | 1 | URL of server providing updated live Triggers |
| @longPoll | 0 . . . 1 | true means use "long poll" protocol; false means reg. poll |

TABLE 2-continued

TPT Structure

| Element/Attribute (with @) | No. permitted | Description & Value |
| --- | --- | --- |
| @pollPeriod | 0 . . . 1 | polling period in seconds when regular polling is used |
| event | 1 . . . N | |
| @eventID | 1 | event_id |
| @startTime | 0 . . . 1 | The start time of the command valid period |
| @endTime | 0 . . . 1 | The end time of the command valid period |
| @destination | 0 . . . 1 | Device type—"receiver": receiver itself; "external_1" external device type1 "external_2" external device type2 |
| @action | 1 | "register"|"suspend-execute"|"terminate-execute"|"suspend-resume"|"terminate-resume"| "terminate"|"event" |
| @diffusion | 0 . . . 1 | Period for applying command diffusion |
| application | 1 | Description for target TDO |
| @appID | 1 | TDO ID |
| @type | 1 | TDO type |
| @url | 1 | TDO URL |
| @priority | 0 . . . 1 | Priority to persist 1: High 0: Normal |
| @expireDate | 0 . . . 1 | Expire date for caching the application |
| capability | 0 . . . N | Receiver required capability for this application |
| streamEvent | 0 . . . 1 | Description for event |
| @streamEventID | 1 | Event ID |
| data | 0 . . . 1 | Embedded data |

The TPT structure of Table 2 includes major and minor protocol version attributes at the TPT level (top level). In one embodiment, these attributes function similarly to the way namespaces can be used to specify different types of TPT data structures for extensibility. The major and minor protocol version attributes allow the reception apparatus 20 to conveniently identify whether a particular TPT instance corresponds to a first release or to some future release of a standard where the structure of the schema may be different.

The TPT structure of Table 2 also includes a simplified XML specification of a diffusion mechanism. As opposed to a diffusion mechanism of a complex type called Diffusion Type with a single attribute, the diffusion mechanism is simplified to just an attribute of the Event Type.

The complex Diffusion Type relates to diffusion occurring during repeated deliveries of the TPT. The first issuance might indicate that 1 in 4 receivers should try to access the server. The second might indicate that 1 in 3 should access, etc. The last one would indicate that all the remaining ones should access. In the more realistic use case, the TPT is retrieved once, and nearly all receivers may want to begin retrieving the referenced assets at that moment. A one-parameter method is suitable for this application.

The prior 3-parameter method involved these items:

rate: An attribute of diffusion element. It indicates the number of timing divided for the randomized diffusion of command execution timing in integer.

range: An attribute of diffusion element. It indicates the scope of the randomized diffusion of command execution timing in seconds.

period: An attribute of diffusion element. It indicates the period to apply the randomized diffusion of command execution timing in seconds since the start time of the command. In other words, the receiver works considering the diffusion only during this period.

The TPT structure of Table 2 also includes a liveTrigger element added at the TPT (top) level, corresponding to a complex type called liveTrigger Type. In one embodiment, the liveTrigger Type consists of one required and two optional attributes. The required attribute specifies the URL of a server or other location within the TS that can provide updated triggers for live events. The optional parameters specify how polling is to be done (e.g., periodic, or "long" poll), and if periodic, the duration of the polling period. However, the liveTrigger Type may consist of different combinations of required and optional attributes in other embodiments.

The TPT structure of Table 2 further includes a capability element, in the Application Type. This feature allows a given Application to be associated with zero or more "capability codes." Each code identifies a data type for which support in the reception apparatus 20 for that data type is essential for meaningful presentation of the application. A given code can be any predetermined symbol or value such as an integer value which references predetermined definitions, or it can be an Internet Media Type string (formerly known as mime-type string). Resource definitions can be, for example, a certain audio or video codec along with the required level of the reception apparatus 20 decoding capability (for codecs, known as profiles and levels).

The capability codes, when present, allow the reception apparatus 20 to ascertain up front, before downloading necessary resources (e.g., TDOs and other assets associated with an application), whether or not it has the capability to decode that content. For example, if support for a certain codec is needed, or a certain protocol level, the reception apparatus 20 should be able to decide whether or not it supports it.

Exemplary semantics of the fields in the TPT structure are as follows:

tpt: The root element of the TPT. One tpt element describes all or a portion (in time) of one programming segment.

id: An attribute of the tpt element such as a string that uniquely identifies the programming segment to which this tpt element targets. In one embodiment, the id string is the locator_part of the corresponding trigger, as described above.

tptType: An attribute of the tpt element. In one embodiment, this attribute is a string that indicates the updatability of this tpt element. The value is "static" or "dynamic". In case of "static," all the timing references in the tpt instance are valid Media Time values. In case of "dynamic", the tpt element may not include valid Media Time values. Therefore, in this case the reception apparatus 20 is expected to acquire and process triggers including <event time> parameters in order to know the proper Media Times for different events. The reception apparatus 20 may also acquire updated timing by receiving an updated (newer version) of the TPT.

majorVersion: A required attribute of the tpt element that is an integer value in the range 1 to 99 that indicates the major protocol version of this TPT instance. The value of majorVersion for this version of the protocol is set to 1, in one embodiment. Each reception apparatus 20 is expected to discard instances of the TPT indicating values of majorVersion it is not equipped to support.

Note that in some embodiments, one TPT instance can describe interactive events for multiple versions of the protocol. For example, a single TPT instance could be usable by receivers that only understand protocol version 1.0 as well as by receivers that also support protocol version 2.0. The latter type of receiver could disregard all or part of the portion of the TPT including the 1.0-level elements, and process the portion of the TPT including the 2.0-level elements.

minorVersion: An optional attribute of the tpt element that is an integer value in the range 0 to 99 that indicates the minor protocol version of this TPT instance. The value of minorVersion is set to 0 in one embodiment. Each reception apparatus 20 is expected to not discard instances of the TPT indicating unrecognized values of minorVersion. The minor protocol version is used to represent changes to the TPT protocol that are not significant enough to cause compatibility issues with older receivers built to an earlier minor protocol version. For receivers that do recognize a certain value of minor protocol version, they can look for and process certain data elements that the older receivers would ignore.

tptVersion: An attribute of the tpt element that is a positive integer value that indicates the version number of the tpt element identified by the id attribute. The tptVersion is incremented whenever any change is made to the TPT.

updatingTime: An optional attribute of the tpt element. When present, this positive integer value indicates the time period in seconds the reception apparatus 20 should use when acquiring an updated TPT by polling. The updatingTime parameter is only valid when the tpt type is "dynamic". Note that one method for delivery of updated event timing is to issue a trigger including <event time> parameters.

beginMt: an optional attribute of tpt element. When present, it indicates the beginning Media Time of the segment or portion of the segment described by this TPT instance.

endMt: An optional attribute of tpt element. When present, it indicates the ending Media Time of the segment or portion of the segment described by this TPT instance.

expireDate: An optional attribute of tpt element. When present, it indicates the date and time of the expiration of the information included in this tpt instance. If the reception apparatus 20 caches the tpt, it can be re-used until the expireDate. The expireDate is formatted as an xs:dateTime string.

liveTrigger: This optional complex type specifies information that is used for the case of the dynamic tpt.

liveTriggerURL: A required attribute of the liveTrigger element. This string indicates the URL of a server that will provide updated triggers for the live broadcast case.

longPoll: An optional attribute of the liveTrigger element. This Boolean element indicates when true that the reception apparatus 20 should use the "long polling" protocol to receive updated triggers. When false, it indicates the reception apparatus 20 should do regular polling at the interval indicated in the pollPeriod attribute.

pollPeriod: An optional attribute of the liveTrigger element. This parameter, when present, indicates the time period in seconds the reception apparatus 20 should use when polling the live Trigger server. A value of 30, for example, indicates the reception apparatus 20 should ask for an updated trigger every 30 seconds.

event: A child element of tpt element. It represents each event affecting TDO operation and life-cycle. One or more events may appear in a TPT instance.

eventID: An attribute of event element. It indicates the unique identifier of command in the form of an unsigned integer. The scope of the uniqueness of eventID is, in one embodiment, the full duration of the programming segment. The eventID is referenced by a trigger containing <event time> parameters.

startTime: An optional attribute of the event element. When present it indicates the start of the valid time period for the event relative to Media Time. The reception apparatus 20 is expected to execute the command when Media Time reaches the value in startTime.

endTime: An optional attribute of the event element. When present it indicates the end of the valid time period for the event relative to Media Time. The reception apparatus 20 is expected to not execute the command when Media Time is past the value in endTime.

destination: An optional attribute of the event element. When present it indicates the device targeted for this event. If the targeted device is the reception apparatus 20 itself, the value is "receiver" or any other predetermined value. If the target device is not the reception apparatus 20, it indicates the other device type or application type.

action: An attribute of event element. It indicates the event action type to control application (TDO) operation and life-cycle. In one embodiment, the value is either of the following:

"register": if possible, acquire and pre-cache resources of the application.

"suspend-execute": suspend any other currently executing application and launch the application. In case of not pre-caching application yet, before launching application, the reception apparatus 20 needs to acquire the resources of the application. If the targeted application is suspended, the reception apparatus 20 resumes it with the former state.

"terminate-execute": terminate any other currently executing application and launch the application. In case of not pre-caching application yet, before launching application, the reception apparatus 20 needs to acquire the resources of the application. If the targeted application is suspended, the reception apparatus 20 resumes it with the former state.

"suspend-resume": suspend any other currently executing application and resume the application.

"terminate-resume": terminate any other currently executing application and resume the application.

"terminate": terminate the application.

"suspend": suspend the application executing. UI and application engine state is required to be preserved until launching again.

"event": Fire the stream event depending on the application script.

diffusion: An optional attribute of the event element. When present, this integer value represents a period of time in seconds, N. The purpose of the diffusion parameter is to smooth peaks in server loading. The reception apparatus 20 is expected to compute a random time period in the range 0-N and delay this amount before accessing an Internet server to retrieve content referenced by URLs in the TPT.

application: A child element of command. It represents the application (e.g., TDO) to which the command targets.

appID: A required attribute of the application element. It indicates the unique identifier of the application (TDO). In one embodiment, the format is a predetermined globally unique format.

appType: A required attribute of application element. It indicates the application format type. In one embodiment, the value only can be "html5."

url: A required attribute of the application element. It indicates the URL where the reception apparatus 20 can acquire the application.

priority: An optional Boolean attribute of the application element. If the reception apparatus 20 caches the application resources after using them once, it may need to manage multiple application resources. The priority indicates the caching priority among applications competing for cache memory space. The value is either normal (value false or 0) or high (value true or 1). If this attribute is not present, in one embodiment, the cache priority is regarded as normal. Alternatively, the cache priority may be regarded as high when the attribute is not present in another embodiment.

expireDate: An optional attribute of the application element. The expireDate parameter is used to help the reception apparatus 20 manage memory resources. It indicates a date and time after which the reception apparatus 20 can safely delete the application resources. The expireDate is expressed in xs:dateTime format.

capability: An element of the application element that is a sequence of zero or more capability code strings. Each capability code string is either an integer or a media type string. When the capability code string is an integer, the integer value corresponds to a predetermined capability code corresponding to capabilities such as a supported video codec, supported audio codec, supported "browser" profile, supported DO engine profile, supported memory size (to signal whether the memory resources in the receiver are sufficient to handle the resources associated with the service), etc. The reception apparatus 20 is expected to process each capability element to determine if it supports the indicated capability. If one or more capability codes are not supported, the reception apparatus 20 is expected to disregard the application instance. In another embodiment, the reception apparatus 20 may determine whether the application instance based on a predetermined or user defined priority of each of the unsupported capability codes.

streamEvent: A child element of the event element. It represents the stream event which enables the application to work synchronously with the broadcast signal in case that action attribute of command element is "event".

streamEventID: A required attribute of the event element. It indicates the unique identifier of the stream event. Referencing between stream event and application can be realized by this identifier.

data: A child element of event element. It describes the embedded data related to the stream event if it exists. The target application will read this data and use it.

An embodiment of the XML schema of a TPT is defined in Table 3 below:

TABLE 3

TPT XML Schema

```
<?xml version="1.0" encoding="UTF-8"?>
<xs:schema xmlns:tpt="urn:atsc2.0"
xmlns:xs="http://www.w3.org/2001/XMLSchema" targetNamespace="urn:atsc2.0"
elementFormDefault="qualified" attributeFormDefault="unqualified">
    <xs:element name="TPT">
      <xs:complexType>
        <xs:sequence>
           <xs:element name="liveTrigger" type="tpt:LiveTriggerType"
minOccurs="0"/>
           <xs:element name="event" type="tpt: EventType"
maxOccurs="unbounded"/>
        </xs:sequence>
        <xs:attribute name="majorVersion" type="xs:string" use="required"/>
        <xs:attribute name="minorVersion" type="xs:string" use="optional"/>
        <xs:attribute name="id" type="xs:ID"/>
        <xs:attribute name="tptType" type="xs:string" default="static"/>
        <xs:attribute name="tptVersion" type="xs:string" use="optional"/>
        <xs:attribute name="updatingTime" type="xs:string" use="optional"/>
        <xs:attribute name="beginMt" type="xs:time" use="optional"
        <xs:attribute name="endMt" type="xs:time" use="optional"/>
        <xs:attribute name="expireDate" type="xs:dateTime" use="optional"/>
      </xs:complexType>
    </xs:element>
    <xs:complexType name="LiveTriggerType">
      <xs:attribute name="liveTriggerURL" type="xs:anyURI" use="required"/>
      <xs:attribute name="longPoll" type="xs:boolean" use="optional"
default="true"/>
      <xs:attribute name="pollPeriod" type="xs:duration" use="optional"/>
    </xs:complexType>
    <xs:complexType name="EventType">
      <xs:sequence>
        <xs:element name="application" type="tpt:ApplicationType"/>
        <xs:element name="streamEvent" type="tpt:StreamEventType"
minOccurs="0"/>
      </xs:sequence>
```

TABLE 3-continued

TPT XML Schema

```
      <xs:attribute name="eventID" type="xs:ID" use="required"/>
      <xs:attribute name="startTime" type="xs:time" use="optional"/>
      <xs:attribute name="endTime" type="xs:time" use="optional"/>
      <xs:attribute name="destination" type="xs:string" use="optional"
default="receiver"/>
      <xs:attribute name="action" type="xs:string" use="required"/>
      <xs:attribute name="diffusion" type="xs:duration" use="optional"/>
    </xs:complexType>
    <xs:complexType name="ApplicationType">
      <xs:sequence>
        <xs:element name="capability" type="xs:string" minOccurs="0"
maxOccurs="unbounded"/>
      </xs:sequence>
      <xs:attribute name="appID" type="xs:ID" use="required"/>
      <xs:attribute name="type" type="xs:string" use="required"/>
      <xs:attribute name="url" type="xs:anyURI" use="optional"/>
      <xs:attribute name="priority" type="xs:boolean" use="optional" default="0"/>
      <xs:attribute name="expireDate" type="xs:dateTime" use="optional"/>
    </xs:complexType>
    <xs:complexType name="StreamEventType">
      <xs:sequence>
        <xs:element name="data" type="xs:string" minOccurs="0"/>
      </xs:sequence>
      <xs:attribute name="streamEventID" type="xs:ID"/>
    </xs:complexType>
</xs:schema>
```

In one embodiment, the reception apparatus 20 is configured to receive updated versions of a TPT when available. The capability to receive an updated version of the TPT provides increased flexibility in providing trigger events when it is difficult to determine the exact timing of trigger events ahead of time, such as in the case of live programming. During the live programming, the TPT can be updated to include timing information once it has been determined. For example, updated versions of the TPT may include modified or new timing information associated with a trigger for displaying supplemental content during the live programming. In another example, the TPT can be updated to refer to different content based on the outcome of the live event.

In another embodiment, the TPT remains unchanged as the program progresses. The timing of execution of specific interactive events is determined by the appearance of a trigger referencing a specific event. When the receiving apparatus 20 receives a trigger, the event referenced in the TPT is executed.

While some forms of the trigger can indicate that the time is right for the TDO to perform a certain action, a series of timed actions can be played out without a trigger. The TPT optionally provides timing information for various interactive events relative to "media time." Each item of interactive content has a timeline for its playout; an instant of time on this timeline is called media time. In other words, the media time is a parameter referencing a point in the playout of an audio/video or audio content item. For example, a 30-minute program may have an interactive event at media time ten minutes and 41 seconds from the beginning of the program, or media time 10:41. The TPT can include an entry indicating the details of the event that is to occur at time 10:41. Once the receiving apparatus 20 determines the current timing relative to the start of the program, it can use the TPT to play out all subsequent events.

The reception apparatus 20 may determine the availability of an updated TPT by referring to a non-real-time (NRT) file in a FLUTE, such as a file version number indicated in a Transport Object Identifier (TOI). FLUTE is defined in RFC 3926, which is incorporated herein by reference in its entirety. In another embodiment, the reception apparatus 20 receives the updated TPT by posting a GET request to the TPT server 40 which remains pending until a new TPT is available. In another embodiment, the reception apparatus 20 periodically accesses a source of the TPT to determine whether a new TPT is available. Alternatively, the reception apparatus 20 accesses a source identified by the liveTrigger element described above.

Likewise, compact triggers may be available via an Internet-based server. As with TPT updates, the receiving apparatus may post a GET request to the TPT server 40 which remains pending until a new triggers is available.

Figure 2:
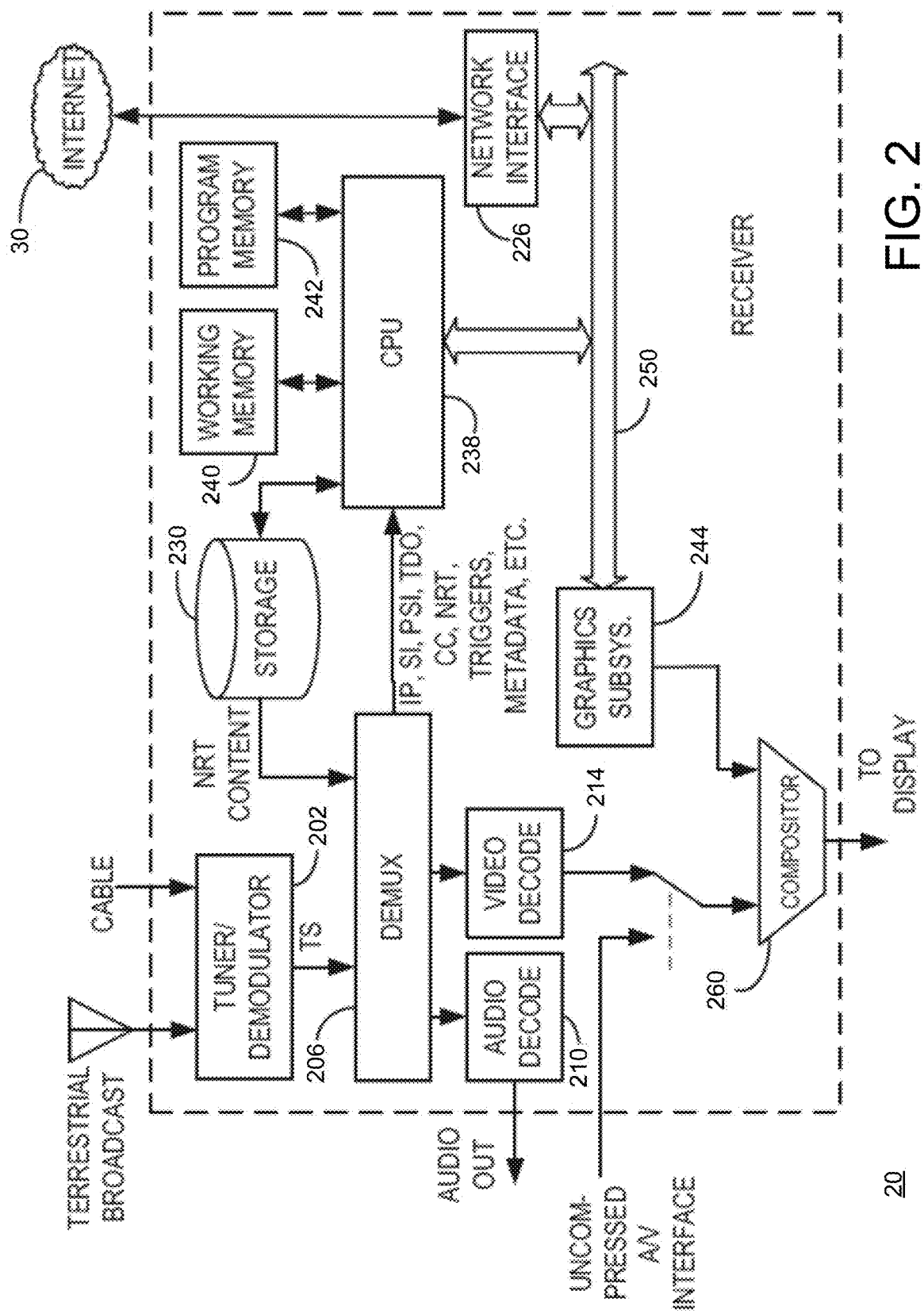
FIG. 2 is a block diagram of an exemplary reception apparatus.

FIG. 2 illustrates an embodiment of the reception apparatus 20. The reception apparatus 20 is a digital television receiver device that may be incorporated into a television set or a set top box. The reception apparatus 20 includes a tuner/demodulator 202, which receives content from one or more content sources such as a terrestrial broadcast or a cable television transmission. The reception apparatus 20 may also, or alternatively, receive content from a satellite broadcast. The tuner/demodulator 202 receives a transport stream (TS), which is demultiplexed by the demultiplexer 206 into audio and video (A/V) streams. The audio is decoded by an audio decoder 210 and the video is decoded by a video decoder 214. Further, uncompressed A/V data may be received via an uncompressed A/V interface (e.g., a HDMI interface) that can be selectively utilized.

In one embodiment, the TS includes ancillary information such as one or more of caption data, TDOs, triggers, TPTs, etc. However, in other embodiments, the A/V content and/or a subset or all of the ancillary information may be received via the Internet 30 and a network interface 226.

A storage unit 230 is provided to store NRT or Internet-delivered content such as Internet Protocol Television (IPTV). The stored content can be played by demultiplexing the content stored in the storage unit 230 by the demultiplexer 206 in a manner similar to that of other sources of content. The storage unit 230 may also store one or more TDOs, triggers, and TPTs acquired by the reception apparatus 20.

The reception apparatus 20 generally operates under control of at least one processor, such as CPU 238, which is coupled to a working memory 240, program memory 242, and a graphics subsystem 244 via one or more buses (e.g., bus 250). The CPU 238 receives closed caption data from the demultiplexer 206 as well as any other information such as TDO announcements and EPGs used for rendering graphics, and passes the information to the graphics subsystem 244. The graphics outputted by the graphics subsystem 244 are combined with video images by the compositor and video interface (compositor) 260 to produce an output suitable for display on a video display. Further, the CPU 238 receives non-closed caption text data, as described above.

Further, the CPU 238 operates to carry out functions of the reception apparatus 20 including the processing of related triggers (e.g., included in the closed caption data), TDOs, TPTs, and browser operations. The browser operations include accessing a service specified by a URL given by the TDO or trigger. The CPU 238 further operates to execute script objects (control objects) contained in the TDO, its trigger(s), etc., using for example the DO Engine Although not illustrated in FIG. 2, the CPU 238 may be coupled to any one or a combination of the reception apparatus 20 resources to centralize control of one or more functions. In one embodiment, the CPU 238 also operates to oversee control of the reception apparatus 20 including the tuner/demodulator 202 and other television resources.

A more processor-centric view of the reception apparatus 20 is illustrated in FIG. 3. Memory and storage 230, 240, and 242 are depicted collectively as memory 310. Further, a processor 300 includes one or more processing units such as CPU 238. Similarly, the various demodulators, decoders, etc., that initially process digital television signals are collectively depicted as television receiver/tuner 320. The reception apparatus 20 further includes a remote controller 360 which communicates with a remote controller receiver interface 340. Additionally, the display 350 is connected to a display interface 330, which includes for example the uncompressed A/V interface and/or compositor 260, and is either a display integral to the reception apparatus 20 as in a television set or a connected display device as in the case where the reception apparatus 20 is integrated into a set-top box.

Memory 310 contains various functional program modules and data. The memory 310 stores the data used by the reception apparatus 20. The memory 310 within the reception apparatus 20 can be implemented using disc storage form as well as other forms of storage such as non-transitory storage devices including for example network memory devices, magnetic storage elements, magneto-optical storage elements, flash memory, core memory and/or other non-volatile storage technologies. It should be noted that the use of the term "non-transitory" in the present disclosure is a limitation of the medium itself (i.e., tangible, not a signal) as opposed to a limitation on data storage persistency (e.g., RAM vs. ROM). When a TDO 316 is received, the TDO 316 is stored in the memory 310. The TDO execution is carried out by a DO Engine 312. The TDO, when executed by the DO Engine 312 presents supplemental content based on one or more triggers associated with the TDO and/or timing information stored in an associated TPT 318. The memory 310 also stores the TPT 318, which in one embodiment, defines one or more parameters for each trigger associated with the TDO.

Figure 4A:
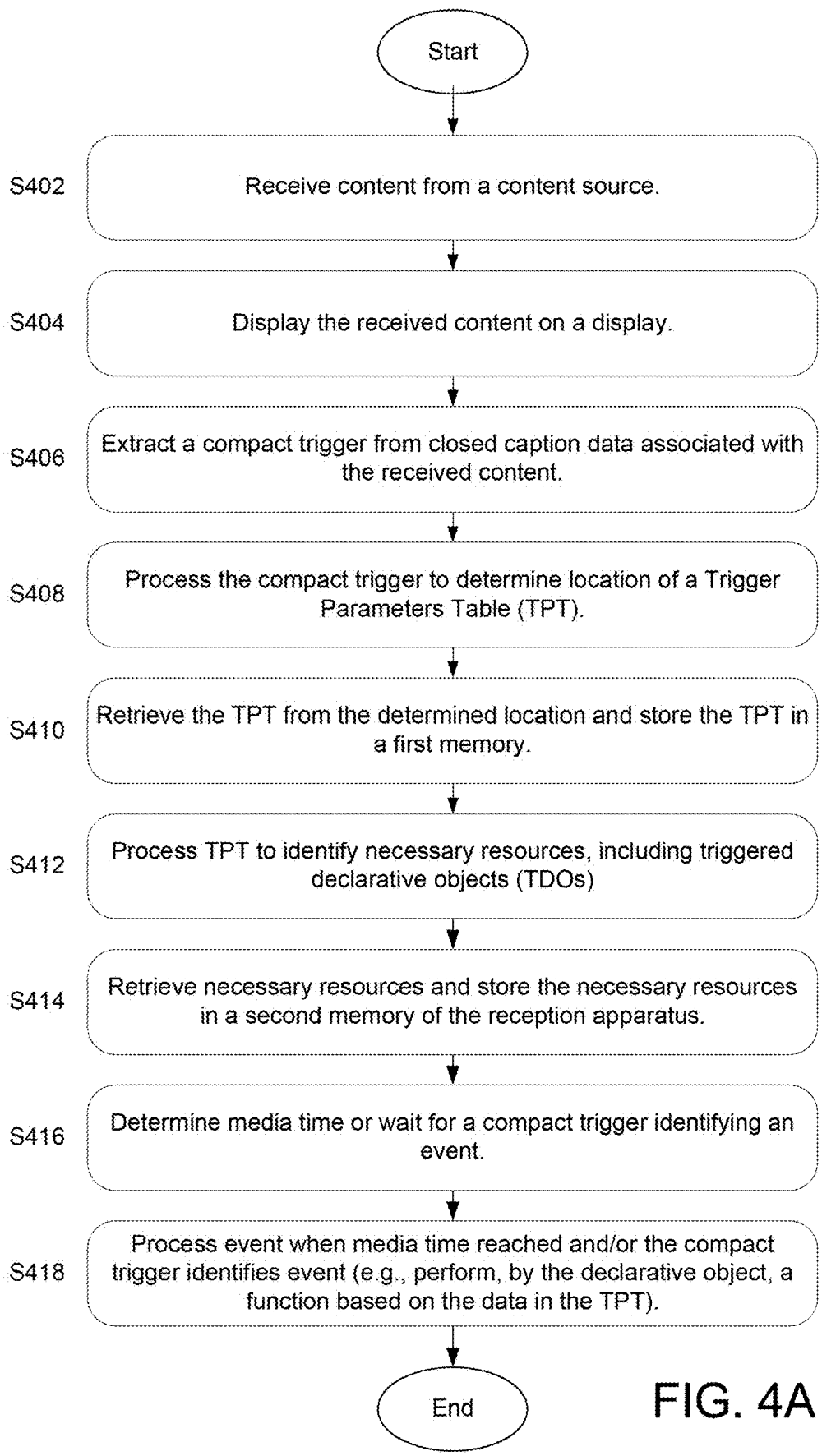
FIG. 4A illustrates a flow diagram of an exemplary method for processing a trigger.

FIG. 4A provides an overview of an exemplary method for processing triggers by, for example, the reception apparatus 20. In step S402, the reception apparatus 20 receives content (e.g., a television program) from a content source, such as the content source 10. The received content is presented to the user of the reception apparatus 20, in step S404. In step S406, the reception apparatus 20 extracts a compact trigger from closed caption data associated with the received content. The reception apparatus 20 processes the compact trigger, in step S408, to determine a location of a TPT.

In step S410, the reception apparatus 20 retrieves the TPT from the determined location and stores the TPT in a first memory of the reception apparatus 20. Further, in step S412, the reception apparatus 20 processes the retrieved and stored TPT to identify necessary resources, including triggered declarative objects (TDOs), associated with the TPT. In another embodiment, the location of one or more necessary resources are identified by one or more separate compact triggers. The determined necessary resources are subsequently retrieved and stored in a second memory of the reception apparatus 20 in step S414. In step S416, the reception apparatus 20 determines a media time or waits for a compact trigger identifying an event. When a media time is reached and/or a compact trigger identifies an event, in step S418, the reception apparatus processes an event such as performing an operation on a declarative object (e.g., a TDO) or having the declarative object perform a function based on the data in the TPT. It should be noted that the event processed in step S418 could correspond to either a type 1 command which the reception apparatus 20 (e.g., the DO Engine 312) knows how to execute or a type 2 command which the reception apparatus 20 passes to the TDO for execution. The first and second memories may correspond to the same memory such as different portions of the storage 230 or working memory 240, or discrete memories.

While triggers must be tightly time-synchronized to the audio/video content (e.g., to coincide with an ad boundary or scene change), the TPT can be delivered far in advance of the events it describes. Because the reception apparatus 20 can collect or download the TPT prior to its use over a period time such as seconds or minutes beforehand, use of the Internet for transport of the TPT becomes feasible.

In one embodiment, the TDO is downloaded from the TDO server 50 and the TPT is downloaded from the TPT server 40 in response to receiving one or more triggers associated with currently received content. For example, the reception apparatus 20 receives a first compact trigger that identifies the location of the TPT. The reception apparatus 20 downloads the TPT from the TPT server 40 in response to receiving the first compact trigger. Subsequently, the reception apparatus 20 processes the TPT and determines that a TDO is a necessary resource. In one embodiment, the reception apparatus 20 determines that the TDO is a necessary resource based on the inclusion of the TDO location in the TPT. In response, the reception apparatus 20 retrieves the TDO from the TDO server 50. In another embodiment, the reception apparatus 20 receives a second compact trigger that identifies the location of the TDO. It should be noted that in the case of receiving the second compact trigger, the order in which the triggers identify the locations of the TPT and TDO can be reversed.

In yet another embodiment, the reception apparatus 20 receives a compact trigger that identifies the location of the TDO. The reception apparatus 20 retrieves the TDO from the location identified by the compact trigger. Subsequently, after the TDO is executed, the TDO itself causes the download of an associated TPT.

As noted above, in one embodiment, once the Internet address (URL) of the TPT server is identified by the trigger, the reception apparatus 20 uses it to acquire the TPT. Upon reception of the TPT, various other referenced assets (e.g., TDOs, files, multimedia assets, etc.), are retrieved by the reception apparatus 20 and stored in memory for possible later use. Once the media time is known, the reception apparatus 20 begins processing the TPT to see if there are any "type 1" or "type 2" commands that are ready for execution.

In step S418, when the reception apparatus 20 receives a trigger associated with a type 1 command (e.g., to execute the TDO), the DO Engine 312, running on the processor 300, executes the TDO. When the reception apparatus 20 receives a trigger associated with a type 2 command in step S418, while the TDO is being executed, the reception apparatus 20 passes the trigger data to the TDO, which retrieves the at least one parameter associated with the trigger event stored in the TPT based on information (e.g., a tag value, media time, etc.) included in the trigger associated with the type 2 command. In another embodiment, the DO Engine 312 retrieves the at least one parameter and passes the retrieved at least one parameter to the TDO. The TDO performs a function based on the at least one parameter retrieved.

Figure 4B:
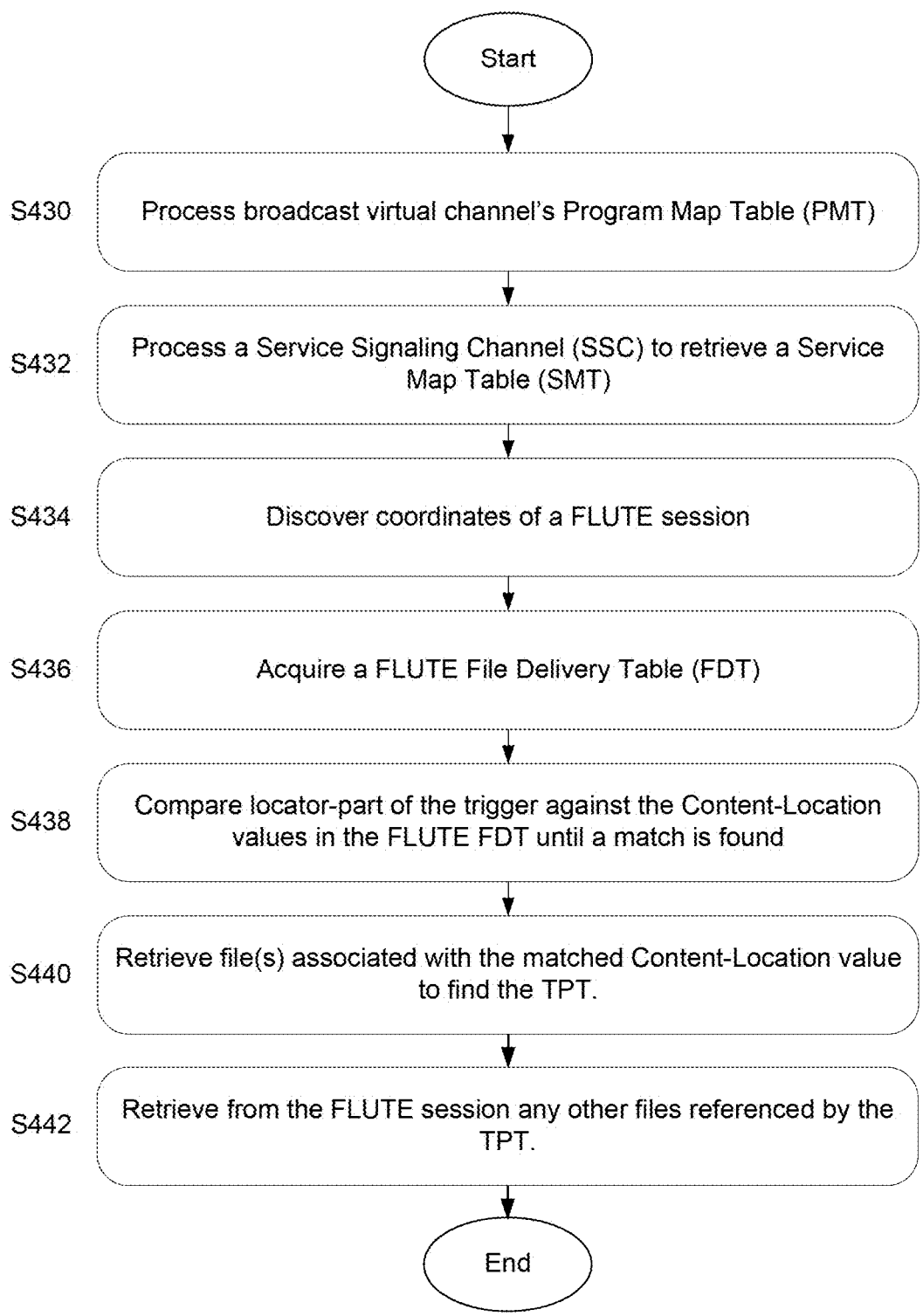
FIG. 4B illustrates a flow diagram of an exemplary method for processing a trigger when a full transport stream (TS) is available.
Figure 4C:
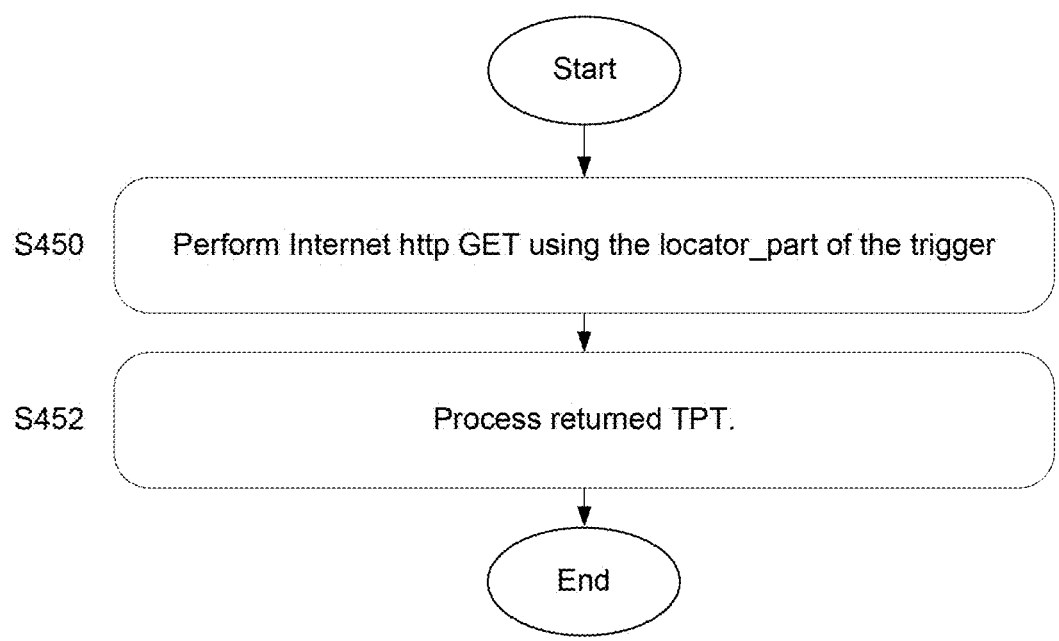
FIG. 4C illustrates a flow diagram of an exemplary method for processing a trigger when Internet access is available.

FIGS. 4B and 4C provide more detailed illustrations of the retrieval of the TPT and other necessary resources, according to one embodiment. Upon reception of a trigger either via the broadcast emission or via an interaction with the ACR system 60, the reception apparatus 20 is expected to access the files referenced by the URL in the locator_part of the Trigger (the portion to the left of the "?"). As described above, two file delivery paths are possible, depending on whether or not the reception apparatus 20 has access to the full broadcast Transport Stream.

FIG. 4B illustrates a case where the full TS is available to the reception apparatus 20, which has no, or poor, Internet access. The trigger processing begins at step S430, at which time the reception apparatus 20 processes a broadcast virtual channel's Program Map Table (PMT) to discover the coordinates of an associated IP subnet. In step S432, the reception apparatus 20 processes a Service Signaling Channel (SSC) of the associated IP subnet to retrieve a Service Map Table (SMT). In step S434, the reception apparatus 20 discovers the coordinates of a FLUTE session based on the retrieved SMT. The reception apparatus 20 acquires a FLUTE File Delivery Table (FDT) for the FLUTE session, in step S436, which yields a list of content items each with a Content-Location value. In step S438, the reception apparatus 20 compares the locator_part of the Trigger against the Content-Location values until a match is found. In step S440, the reception apparatus 20 retrieves the file(s) associated with the matched Content-Location value to find the TPT. In step S442, the reception apparatus 20 retrieves any other files referenced by the TPT from the FLUTE session.

FIG. 4C illustrates a case where good Internet access is available. The trigger processing begins at step S450, at which time the reception apparatus 20 performs an Internet http GET using the locator_part of the trigger. In one embodiment, the Internet http GET is performed using a spread algorithm. In step S452, the reception apparatus 20 processes the returned TPT to discover and retrieve other content items that may be needed.

In one embodiment, when the reception apparatus 20 has access to both the full TS and good Internet access, the reception apparatus 20 defaults to retrieving the TPT via the full TS to reduce load on the Internet server. In other embodiments, the reception apparatus 20 defaults to retrieving the TPT via the Internet or selects between the full TS and Internet server based on predetermined criteria (e.g., based on the time required to retrieve the TPT via the full TS and the Internet, whether the Internet connection is being used by another process of the reception apparatus 20 such as a software update, etc.).

Figure 4D:
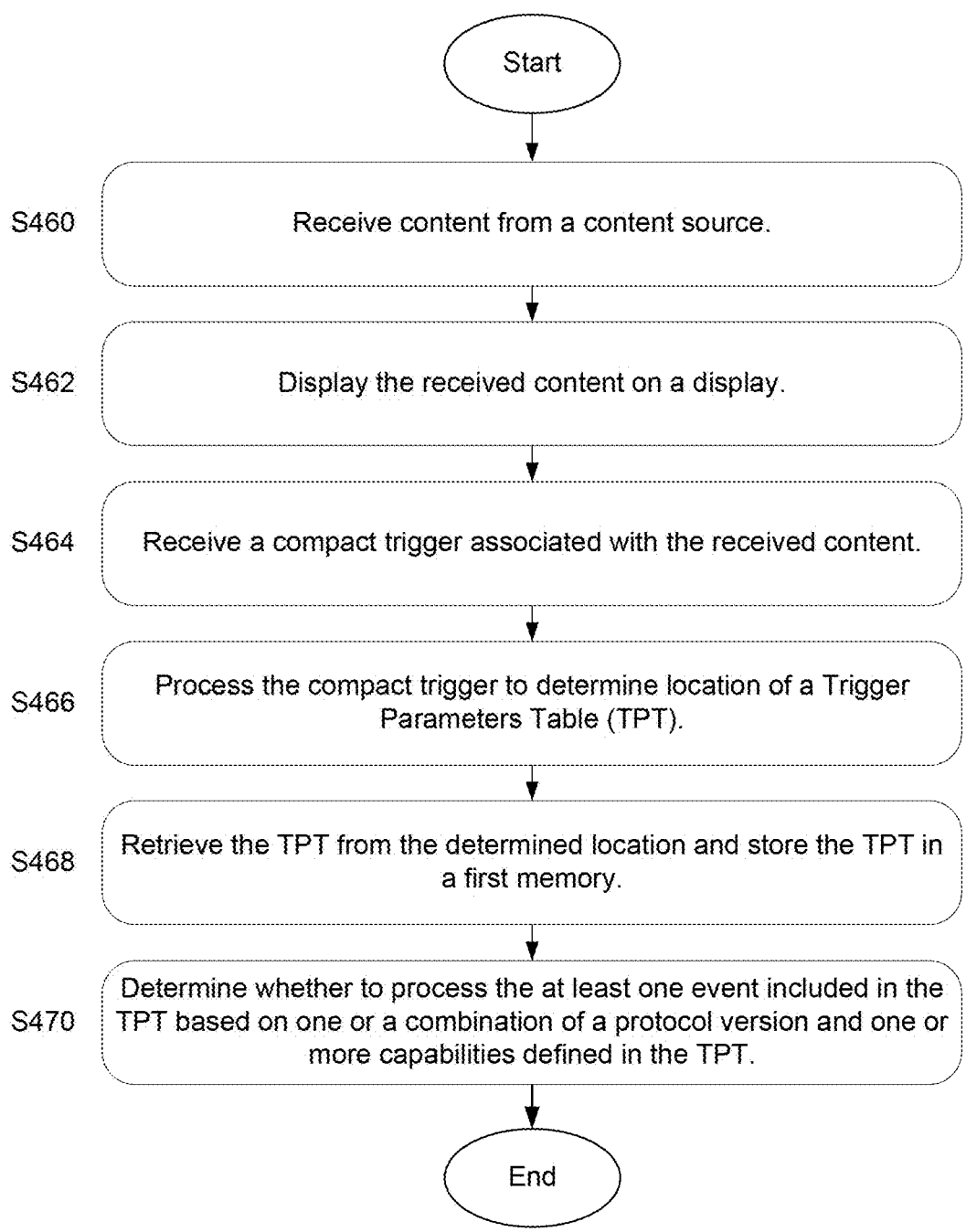
FIG. 4D illustrates a flow diagram of another exemplary method for processing a trigger.

FIG. 4D provides an overview of another exemplary method for processing triggers by, for example, the reception apparatus 20. In step S460, the reception apparatus 20 receives content (e.g., a television program) from a content source, such as the content source 10. The received content is presented to the user of the reception apparatus 20, in step S462. In step S464, the reception apparatus 20 receives a compact trigger associated with the received content. The reception apparatus 20 processes the compact trigger, in step S466, to determine a location of a TPT. In step S468, the TPT is retrieved from the determined location and stored in a first memory. In step S470, the reception apparatus 20 determines whether to process the at least one event included in the TPT based on one or a combination of a protocol version and one or more capabilities defined in the TPT.

In a further embodiment, the reception apparatus 20 may be further configured to perform one or more of the steps described above with respect to FIG. 4A. One or a combination of the steps discussed above with respect to FIG. 4A may be performed before or after the determination in step S470. For example, the reception apparatus 20 may be configured to process the TPT to identify necessary resources, including TDOs, associated with the TPT. In another embodiment, the location of one or more necessary resources are identified by one or more separate compact triggers. The determined necessary resources are subsequently retrieved and stored in a second memory of the reception apparatus 20 as discussed with respect to step S414 above.

Further, similar to FIG. 4A, the reception apparatus 20 may further determine a media time or wait for a compact trigger identifying an event. When a media time is reached and/or a compact trigger identifies an event, the reception apparatus processes an event such as performing an operation on a declarative object (e.g., a TDO) or having the declarative object perform a function based on the data in the TPT. As discussed above, the event processed could correspond to either a type 1 command which the reception apparatus 20 (e.g., the DO Engine 312) knows how to execute or a type 2 command which the reception apparatus 20 passes to the TDO for execution. Further, the first and second memories may correspond to the same memory such as different portions of the storage 230 or working memory 240, or discrete memories.

Figure 5:
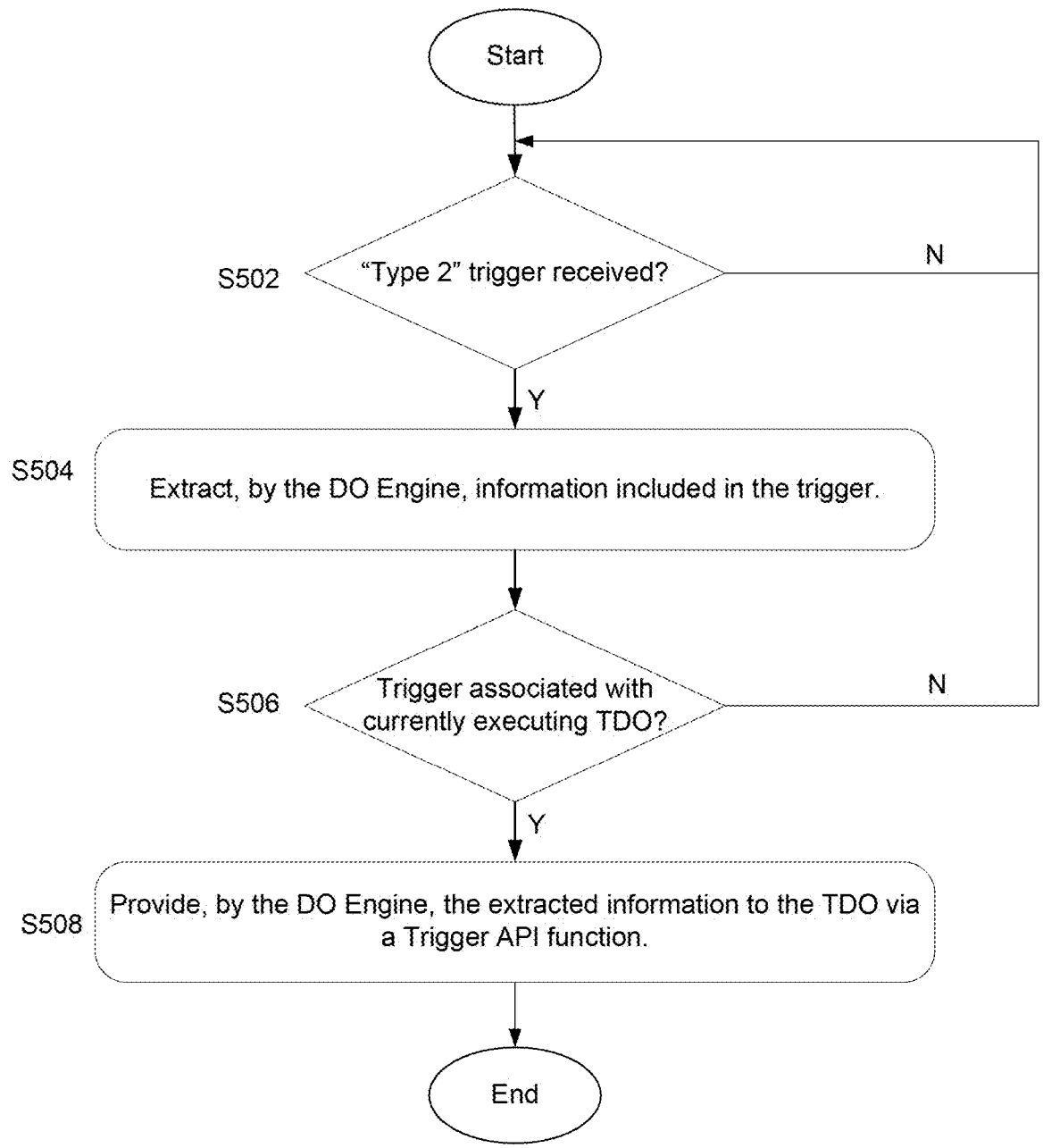
FIG. 5 illustrates a more detailed flow diagram of an exemplary method of a Declarative Object (DO) Engine for processing the trigger.

FIG. 5 is a more detailed illustration of an exemplary method for processing a trigger associated with a type 2 command (e.g., a "lifecycle" or "DO engine" command) using the DO Engine. In step S502, the DO Engine 312 determines whether a trigger of associated with the type 2 command (e.g., a "DO event" command) has been received. In one embodiment, the DO Engine 312 determines the type of the trigger based on whether the trigger specifies a command to be executed by the DO Engine 312. For example, if the trigger includes a tag value that has been assigned to a command to be executed by the DO Engine 312. In other embodiments, the DO Engine 312 determines whether a trigger is associated with a type 1 or type 2 command based on information included in the TPT entry. For example, the TPT entry itself can including information specifying that it corresponds to a type 1 or type 2 command. In another example, the DO Engine 312 determines whether the TPT entry includes a DO Engine command.

When the trigger associated with a type 2 command is determined to be received in step S502, the DO Engine extracts information included in the trigger in step S504. In one embodiment, the trigger information includes one or a combination of a TDO identifier (e.g., a TDO URL) and a reference to a TPT and/or one or more table entries containing parameters and data associated with this trigger event. The TDO identifier can be any unique identifier such as a reference number, URL, symbol, or other representation. The reference can be tag value such as an index number (small integer) or a media time. In some embodiments, the trigger only includes the reference information.

In step S506, the DO Engine determines whether the trigger is associated with a currently executing TDO based on the extracted TDO identifier. When, the trigger is determined to be associated with the currently executing TDO, in step S508, a reference (e.g., a tag value) extracted from the trigger is provided to the TDO, via a trigger application program interface (API) function. The tag value may be extracted with the TDO identifier or at any time prior to the tag value being provided to the TDO.

When the trigger is determined not to be associated with the currently executing TDO, in one embodiment, the trigger is discarded and the DO Engine 312 returns to step S502 and waits for receipt of the next trigger associated with the type 2 command. Alternatively, the DO Engine 312 may temporarily suspend, or terminate, the currently executed TDO and execute a TDO associated with the trigger before proceeding the step S508. For example, in one embodiment, when the trigger is determined not to be associated with the currently executing TDO, the currently executing TDO is terminated or suspended and the TDO associated with the trigger is executed. When the currently executing TDO is suspended, execution of the suspended TDO is resumed when a trigger associated with the suspended TDO is later received.

FIG. 6A illustrates an example of triggers delivered in association with two programming segments. In this example, both segments are "pre-produced," meaning that the content is not from a live broadcast; interactive elements have been added in post-production.

As shown, a short time prior to the occurrence of programming segment 1, a "pre-load" trigger is delivered to allow the reception apparatus 20 an opportunity to acquire the TPT and interactive content associated with programming segment 1. Delivery of a pre-load trigger is optional; if not transmitted, each reception apparatus 20 is expected to use the first trigger it sees within the segment to acquire the content.

Triggers are sent throughout segment 1, as shown, to indicate the current Media Time relative to the segment. Note that there is no requirement that the first frame of the segment be associated with Media Time zero, although such a practice may be common and helpful. Periodic delivery of Media Time Triggers is necessary to allow any reception apparatuses 20 which are just encountering the channel to synchronize and acquire the interactive content.

Just prior to the beginning of segment 2, a pre-load Trigger for that upcoming segment is sent.

Note that in the case of pre-produced content (i.e., non-live), in one embodiment, the TPT that the reception apparatus 20 acquires after processing the first Trigger defines the timing of all elements of the interactive experience for that segment. All that is needed for the reception apparatus 20 and TDO to play out the interactive elements is the knowledge of the media timing; the TPT describes interactive events relative to Media Time.

Figure 6B:
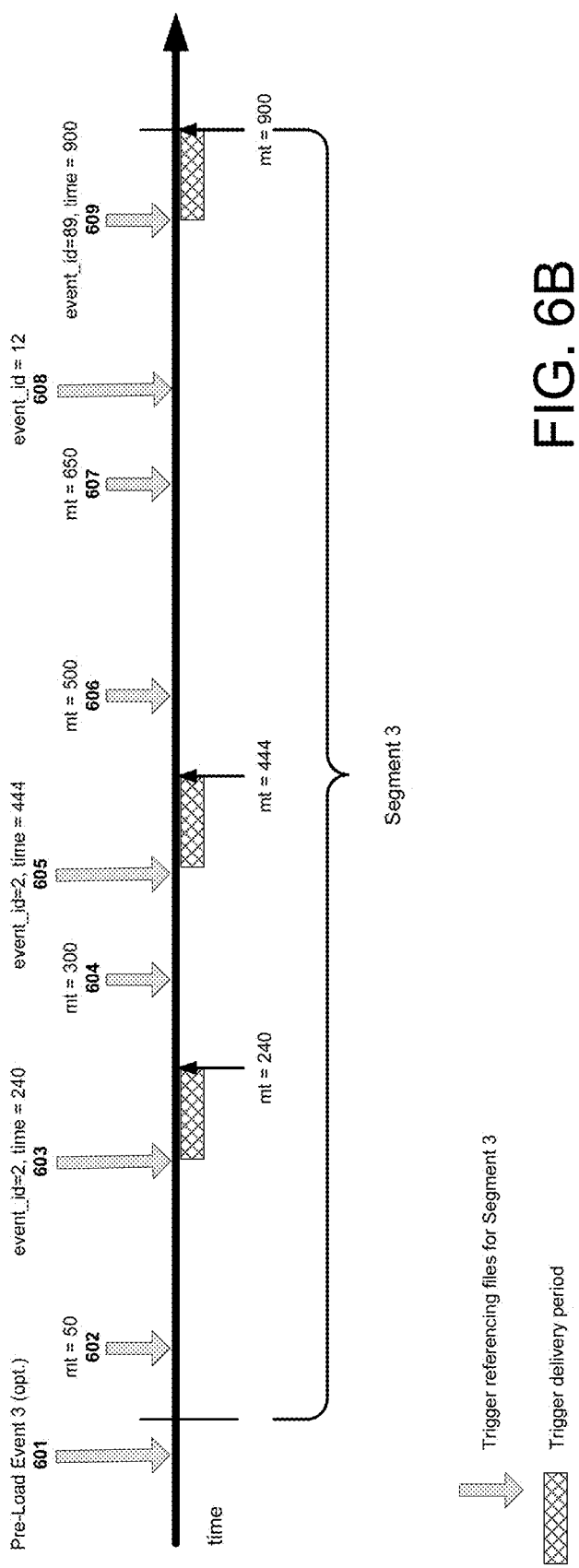
FIG. 6B illustrates exemplary trigger timings for live content.

For the case of live content, the TPT still contains data and information pertinent to different interactive events, however the timing of playout of those events cannot be known until the action in the program unfolds during the broadcast. For the live case, the "event-timing" function of the Trigger is utilized. In this mode, the Trigger signals that a specified interactive event in the TPT is to be re-timed to a specified new value of Media Time. Alternatively, the Trigger can indicate that a certain event is to be executed immediately. FIG. 6B illustrates the live-event case.

The example in FIG. 6B shows a program segment called "segment 3" with nine Triggers. The function of each of the numbered triggers is as follows:

Trigger 601 is a pre-load Trigger referencing the directory where the files for segment 3 may be acquired. Trigger 602 is a Media Time Trigger used to establish the playout timing for segment 3. Trigger 603 is an event re-timing Trigger indicating that the event with event_id=2 in the TPT is to be re-timed to occur at Media Time 240. The hatched area indicates the time interval prior to 240 over which Trigger 403 may be delivered to the reception apparatus 20. Trigger 604 is another Media Time Trigger. Trigger 605 is an event re-timing Trigger indicating that the event with event_id=5 in the TPT is to be re-timed to occur at Media Time 444. Triggers 606 and 607 are additional Media Time Triggers. Trigger 608 is an event Trigger indicating that the event with event_id=12 in the TPT is to be executed immediately. Further, Trigger 609 is an event re-timing Trigger indicating that the event with event_id=89 in the TPT is to be re-timed to occur at Media Time 900.

Figure 6C:
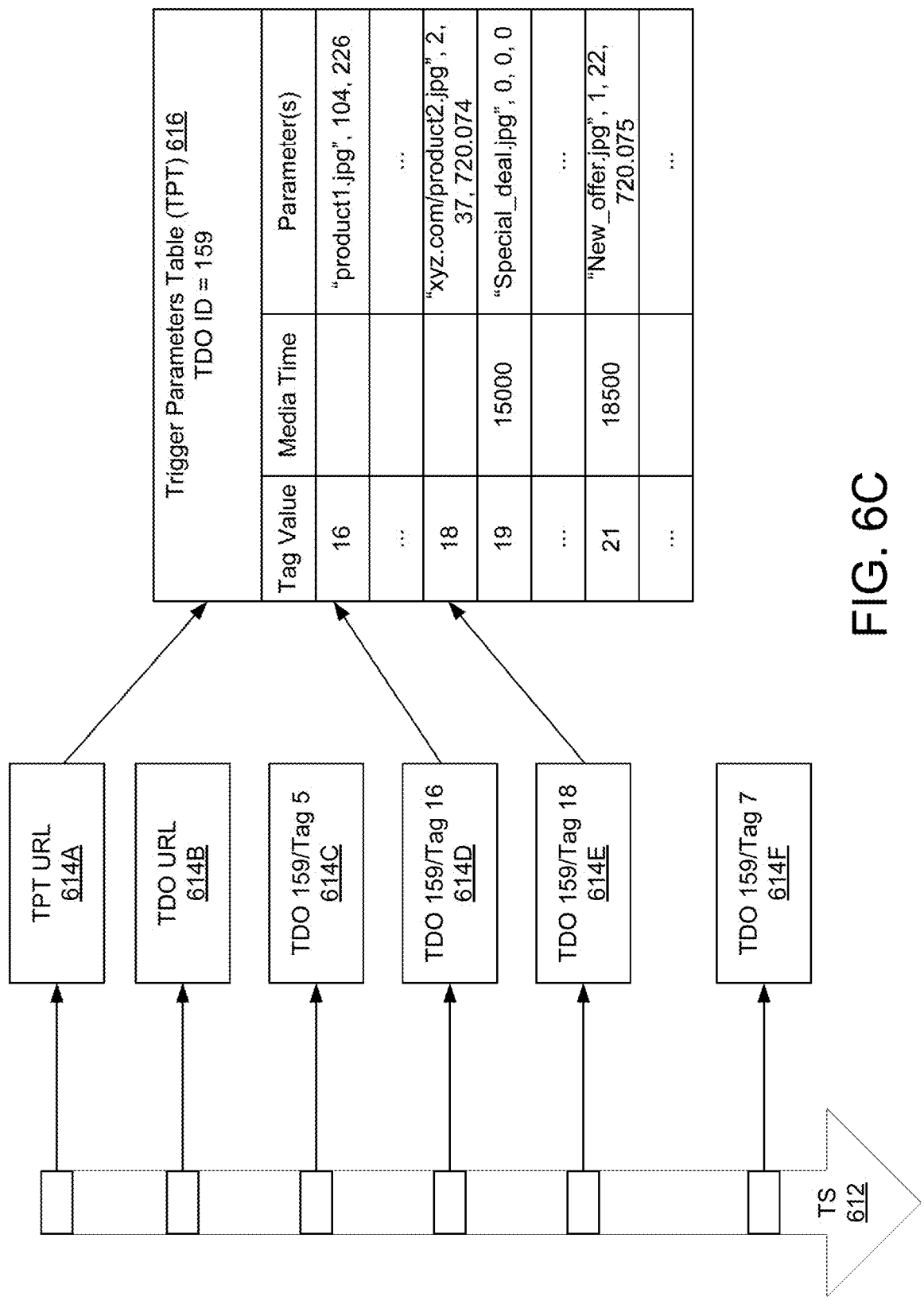
FIGS. 6C and 6D illustrate exemplary triggers and associated TPTs.
Figure 6D:
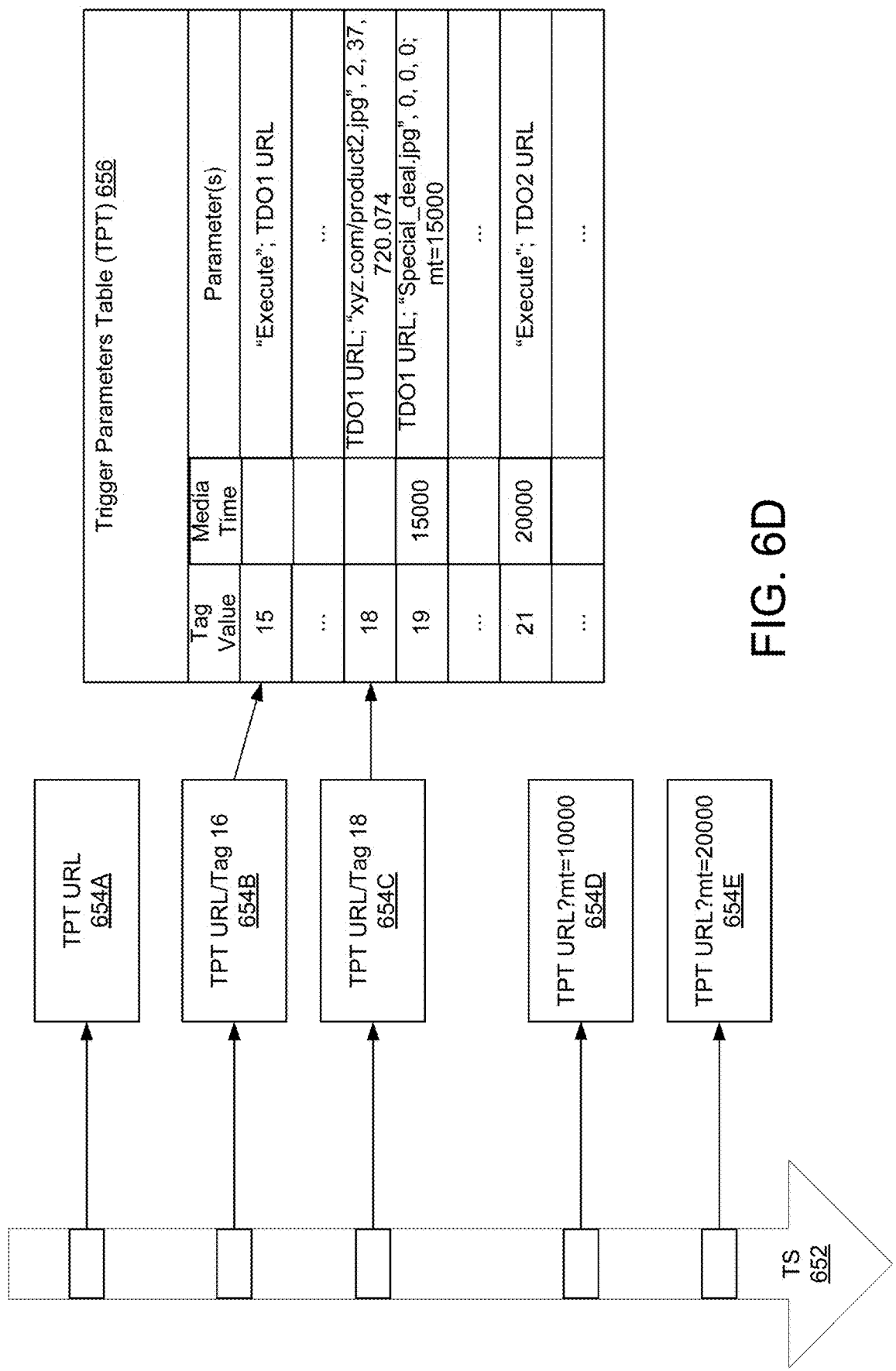

As illustrated in FIGS. 6C and 6D, in one embodiment, the TPT includes a primary key (e.g., a tag element, media time, etc.) that associates each element (row) in the table with an associated trigger event. Each trigger, in turn, will refer to a particular event in the TPT by means of this key.

FIG. 6C illustrates a TPT 616 which, according to one embodiment, only contains parameters for a particular TDO (e.g., TDO 159). In one embodiment, prior to executing the TDO whose ID is 159, the reception apparatus 20 downloads the TDO itself along with associated files, one of which is the TPT. The TDO has script-level access to the TPT. As noted above, depending on the embodiment, the TPT is downloaded prior to or after the TDO, the TDO is downloaded from a location identified by the TPT, the TPT is downloaded from a location identified by the TDO, etc.

A TS 612 carrying content is associated with a plurality of events identified by triggers 614A-614F. The triggers 614A-614C and 614F are associated with type 1 commands; and triggers 614D and 614E are associated with type 2 commands. The triggers associated with type 1 commands are processed by the DO Engine 312, while the triggers associated with type 2 commands are processed by a TDO.

In FIG. 6C, the reception apparatus 20 receives the triggers 614A and 614B, which identify the locations of the TPT 616 and TDO 159, respectively. The reception apparatus 20 retrieves and stores the TPT 616 and TDO 159 based on the identified locations. It should be noted that the TPT 616 and TDO 159 can be received in any order. Further, in other embodiments, the TPT 616 identifies the location of the TDO 159 or the TDO 159 identifies the location of the TPT 616.

Each of triggers 614D and 614E is associated with a row (or element) in the TPT, such as TPT 616, and includes a reference to a specific entry in the TPT using, for example, a tag value. The DO Engine 312 extracts a tag value from each of the triggers 614D and 614E, which are associated with type 2 commands, and provides the extracted tag value to a currently executed TDO. The TDO uses the tag value to determine at least one parameter that is associated with the trigger. Then, as noted above, the TDO performs a function based on the retrieved at least one parameter. It should be noted that the reference to the TPT entry is not limited to a tag value and can be any symbol or representation that can be used to reference an entry in the TPT.

Further, in one embodiment, predetermined tag values (e.g., tag values below 16) are associated with predetermined commands to be executed by the DO Engine 312. Accordingly, certain triggers such as a subset or all triggers associated with type 1 commands need not be associated with a row (or element) in the TPT. For example, when the reception apparatus 20 receives the trigger 614C with a tag value of 5, the reception apparatus 20 executes a TDO 159 that is stored in the reception apparatus 20. In another example, when the reception apparatus 20 receives a trigger 614F with a tag value of 7, the DO Engine 312 terminates, or suspends, the TDO 159. Accordingly, in these examples, the tag value 5 is specified as an "Execute" command and the tag value 7 is specified as a "Terminate" or "Suspend" command.

In one embodiment, the predetermined tag values are specified in a standard as commands to be executed by the DO Engine 312. The specified basic trigger types to be executed by the DO Engine 312 itself include "Register," "Execute," "Suspend," "Resume," and "Terminate." Any other tag values, symbols, or representations may be reserved for DO Engine commands. Further, in other embodiments, the triggers associated with type 1 commands refer to entries in the TPT 616 or a separate TPT to provide any parameters required to execute a command. For example, when the trigger is associated with a type 1 command that is "load TDO," the trigger includes the location (e.g., a URL), or a reference to the location (e.g., entry in a TPT) of the TDO so that it can be acquired by the reception apparatus 20. That is, in other embodiments, a trigger associated with a type 1 command may include a reference to an entry in a TPT that identifies the location of a TDO to be retrieved and executed, as illustrated for example in FIG. 6D.

Further, as illustrated in FIG. 6C, the TPT 616 includes TPT entries (e.g., tag values 19 or 21) that are utilized by the TDO 159 when the specified media times have arrived. The arrival of a specified media time may be determined based on the receipt of a trigger including the specified media time or by the reception apparatus 20. For example, the TDO 159 monitors the current media time of the received content and processes parameters when the media time equals 15000 and 18500, respectively, Alternatively, the DO Engine 312 monitors the current media time and passes the tag value to the TDO 159 at the appropriate time.

In one embodiment, the media time represents the number of milliseconds that have elapsed in the received content. However, any other unit of time could be used to represent the media time. Further, any one or a plurality of the triggers 614A-614F can include additional parameters such as media time information for use by the reception apparatus 20, DO Engine 312, and/or TDO 159, as a reference point for determining the current media time in the received content.

FIG. 6D illustrates an exemplary TPT that contains parameters for triggers associated with type 1 and type 2 commands. It should be noted that separate TPTs for the type 1 and type 2 commands could alternatively be provided. Triggers 654A, 654B, 654D, and 654E are associated with type 1 commands; and trigger 654C is associated with a type 2 command. As described above, in one embodiment, the reception apparatus 20 retrieves the TPT 656 based on the trigger 654A, which identifies the location of the TPT 656. Further, the reception apparatus 20 processes the TPT 656 and determines that necessary resources for the TPT include TDO1 and TDO2. Subsequently, the reception apparatus 20 retrieves the TDO1 and TDO2 based on the locations identified in the TPT 656.

When the reception apparatus receives trigger 654B, in one embodiment, the DO Engine 312 determines that the trigger is associated with a type 1 command based on the tag value falling within a predetermine range of tag values (e.g., tag value less than 16), as described above. In another embodiment, the DO Engine 312 determines that the trigger is associated with the type 1 command based on the presence of a command such as "Execute" or other identifying information in the corresponding TPT entry. The reception apparatus 20 executes the TDO1 in response to receiving the trigger 654B.

When the reception apparatus 20 receives the trigger 654C, the DO Engine 312 extracts the tag value from the trigger 654C and determines that the trigger is associated with a type 2 command. In one embodiment, the DO Engine 312 determines that the trigger 654C is associated with a type 2 command based on the tag value falling outside of a predetermined range (e.g., tag value is 16 or greater). In other embodiments, the DO Engine 312 makes the determination based on information included in the TPT 656. The DO Engine 312 provides the extracted tag value to the TDO1. The TDO1 uses the tag value to determine at least one parameter that is associated with the trigger. Further, the TDO1 performs a function based on the at least one parameter.

As illustrated in FIG. 6D, the reception apparatus 20 receives triggers 654D and 654E. These triggers provide the reception apparatus 20, DO Engine 312, and/or a TDO a reference point for determining the current media time in the received content. The DO Engine 312 and/or an executing TDO monitors the current media time to determine whether any entries in the TPT 656 should be processed. For example, when the DO Engine 312 determines that the current media time is 20000, the DO Engine executes TDO2 in accordance with the TPT entry with the tag value 21. In another example, when the DO Engine 312 or TDO1 determines that the current media time is 15000, the TDO1 is caused to process, or processes, the parameters included in the TPT entry with the tag value 19. In another embodiment, the media time information included in the trigger itself is used to identify a TPT entry.

The TPT 606 illustrated in FIGS. 6C and 6D contains references to image files. As illustrated in FIG. 6C, one graphic is associated with each tag value or media time. However, the TPTs 606 and 656 are not so limited and can refer to one or a combination of different media types such as audio, video, an image, and/or one or more interactive elements. As noted above, predetermined tag values (e.g., below 16) may be specified in a standard as commands to be executed by the DO Engine. Therefore, in one embodiment, the TPT only contains entries for tag values 16 and above. In another embodiment, TPT entries are provided for all tag values.

For example, when the reception apparatus 20 receives a trigger 614D with a tag value of 16, the DO Engine 312 passes the tag value 16 to the TDO 159, which is currently executing. The DO Engine 312 passes the tag value by calling a Trigger API function, which is supported by the DO Engine 312, and delivers the tag value to the TDO 159. The Trigger API function may be included in the DO Engine 312 or a separate programming component of the reception apparatus 20. The TDO 159 accesses the TPT 616 and determines the parameters associated with the trigger are "product1.jpg" and the numbers 104 and 226. In one embodiment, the function performed by the TDO 159 based on the determined parameters includes rendering the image file "product1.jpg" at location X, Y (104, 226) on the display 350.

The TPT, however, is not limited to including information on image files and position, and can include other parameters such as (as mentioned) a media time that designates the timing of any given interactive elements, validity information for defining an expiration date of the trigger, capability codes that allow the reception apparatus 20 to determine whether it is capable of providing the supplemental content associated with the TPT or a specific TPT entry, etc. The TPT could include a URL the TPT could use to fetch an updated parameter set from an Internet server, where the data set represents a weather report, sports scores, player statistics, or any other time-sensitive data. As another example, the TPT may include one or more capability codes that indicate the TPT can only be processed by a reception apparatus supporting "ATSC 2.7+," a minimum requirement code such as support for certain media formats and decoders, essential and non-essential capabilities, etc.

Note that, in one embodiment, the DO Engine 312 itself does not try to interpret anything carried in a given row of the TPT instance, such as the row identified with Tag Value 21 in TPT 616. The information contained in the TPT instance is known and interpretable only to the TDO it is designed to work with. Therefore, the number and types of parameters included in a TPT may be customizable based on the requirements of an associated TDO. In other words, the TPT is not limited to including a predetermined set of parameters and may contain any parameter that is required by a particular TDO.

Figure 7:
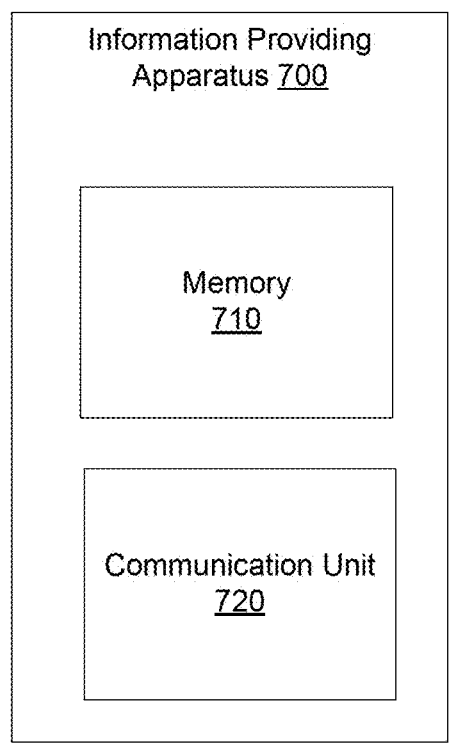
FIG. 7 is a block diagram of an exemplary information providing apparatus.

FIG. 7 illustrates an information providing apparatus 700, which may be included in the content source 10, TPT server 40, TDO server 50, ACR system 60, or a stand-alone device. As illustrated in FIG. 7, the information providing apparatus 700 includes a memory 710 and a communication unit 720. The memory 710 can be implemented using disc storage form as well as other forms of storage such as non-transitory storage devices including for example network memory devices, magnetic storage elements, magneto-optical storage elements, flash memory, core memory and/or other non-volatile storage technologies. Further, the communication unit 720 can be implemented using any one or a combination of a terrestrial broadcast transmitter, a cable broadcast transmitter, a satellite uplink transmitter, a network interface (e.g., WLAN card, Ethernet card, etc.), or the like.

The memory 710 is configured to store a TPT, which includes at least one event associated with one or a combination of a trigger identifier and a media time of content to be provided to a reception apparatus. The communication unit 720 provides the TPT stored in the memory 710 to the reception apparatus 20. For example, the communication unit 720 provides the TPT to the reception apparatus 20 via the TS or the Internet. The TPT is provided at a location identified in a trigger included within closed caption data associated with the content provided to the reception apparatus.

Figure 8:
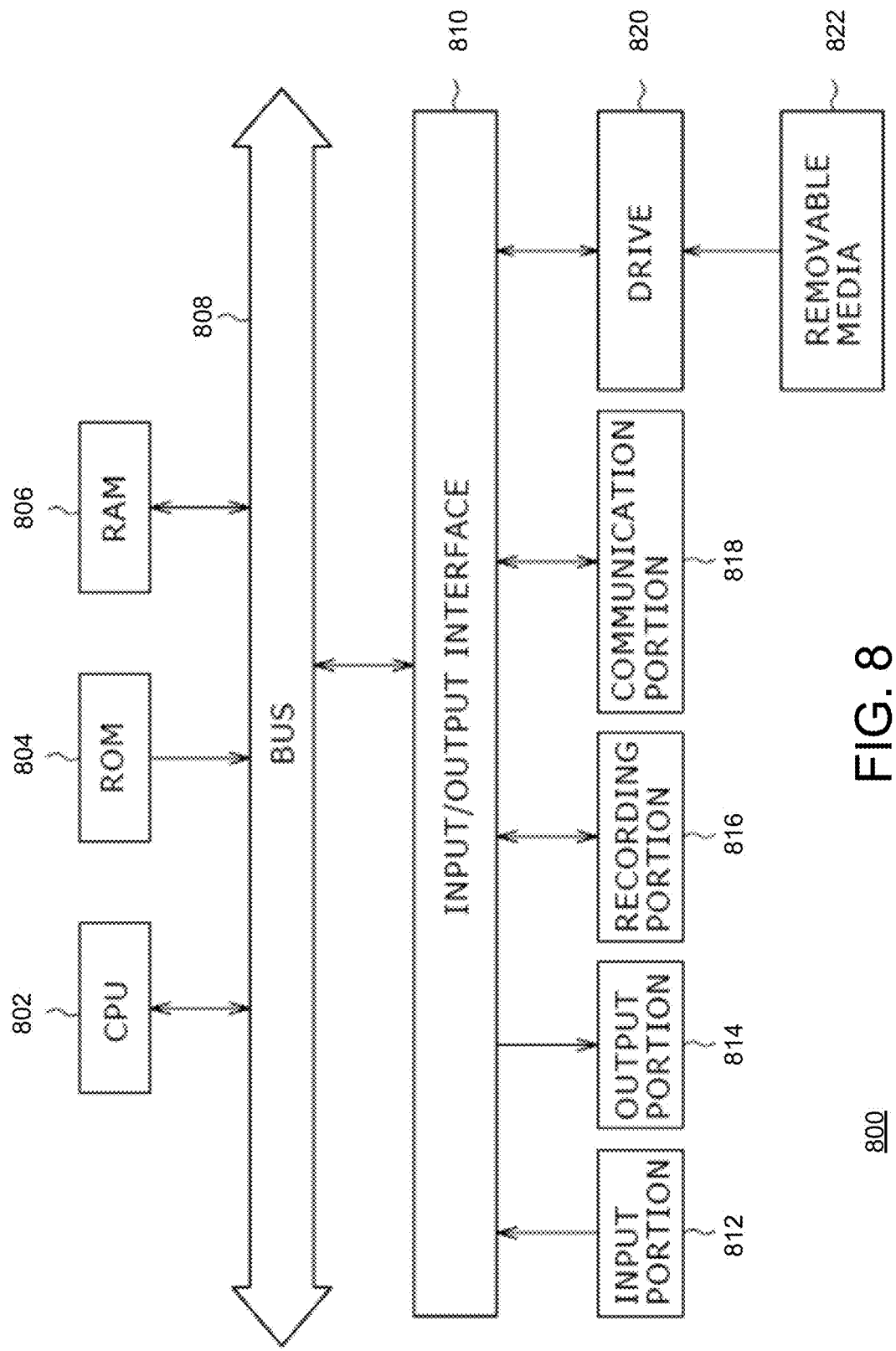
FIG. 8 is an exemplary computer.

FIG. 8 is a block diagram showing an example of a hardware configuration of a computer 800 configured to function as any one or a combination of the content source 10, reception apparatus 20, TPT server 40, TDO server 50, ACR system 60, and information providing apparatus 700.

As illustrated in FIG. 8, the computer 800 includes a central processing unit (CPU) 802, read only memory (ROM) 804, and a random access memory (RAM) 806 interconnected to each other via one or more buses 808. The one or more buses 808 is further connected with an input-output interface 810. The input-output interface 810 is connected with an input portion 812 formed by a keyboard, a mouse, a microphone, remote controller, etc. The input-output interface 810 is also connected to a output portion 814 formed by an audio interface, video interface, display, speaker, etc.; a recording portion 816 formed by a hard disk, a non-volatile memory, etc.; a communication portion 818 formed by a network interface, modem, USB interface, fire wire interface, etc.; and a drive 820 for driving removable media 822 such as a magnetic disk, an optical disk, a magneto-optical disk, a semiconductor memory, etc.

According to one embodiment, the CPU 802 loads a program stored in the recording portion 816 into the RAM 806 via the input-output interface 810 and the bus 808, and then executes a program configured to provide the functionality of the one or combination of the content source 10, reception apparatus 20, TPT server 40, TDO server 50, ACR system 60, and information providing apparatus 700

The various processes discussed above need not be processed chronologically in the sequence depicted as flowcharts; the steps may also include those processed parallelly or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of a reception apparatus for processing control information, comprising:
receiving content from a content source;
controlling a display to display the received content;

receiving the control information during the display of the received content, the control information including location information indicating a location of application information, the application information including an application control document;

computing a random time period based on a diffusion attribute included in the received control information;

retrieving the application information using the location information based on a change in the control information after the computed random time period has elapsed;

loading the application control document; and controlling the display in accordance with the application control document.

2. The method according to claim 1, wherein the control information includes reception apparatus capability information.

3. The method according to claim 1, wherein the control information includes application identification information.

4. The method according to claim 1, wherein the control information includes application control validity time information.

5. The method according to claim 1, wherein the receiving the content comprises:

receiving the content via at least one of a satellite broadcast, a cable television transmission, a terrestrial television broadcast, and the Internet.

6. The method according to claim 1, wherein the retrieving the application information comprises:

accessing a source of the application information via the Internet.

7. The method according to claim 1, wherein the retrieving the application information comprises:

receiving the application information via a broadcast.

8. A reception apparatus, comprising:

a receiver configured to receive content from a content source;

a display interface configured to output the received content for display; and a processor configured to:

receive control information during the display of the received content, the control information including location information indicating a location of application information, the application information including an application control document;

compute a random time period based on a diffusion attribute included in the received control information;

retrieve the application information using the location information based on a change in the control information after the computed random time period has elapsed;

load the application control document; and control the display in accordance with the application control document.

9. The reception apparatus according to claim 8, wherein the control information includes reception apparatus capability information.

10. The reception apparatus according to claim 8, wherein the control information includes application identification information.

11. The reception apparatus according to claim 8, wherein the control information includes application control validity time information.

12. The reception apparatus according to claim 8, wherein the receiver is configured to receive the content via at least one of a satellite broadcast, a cable television transmission, a terrestrial television broadcast, and the Internet.

13. The reception apparatus according to claim 8, wherein the processor is configured to retrieve the application information by accessing a source of the application information via the Internet.

14. The reception apparatus according to claim 8, wherein the processor is configured to retrieve the application information by receiving the application information via a broadcast.

15. A non-transitory computer-readable storage medium having embedded therein instructions, which when executed by a computer, cause the computer to perform a method of a reception apparatus for processing control information, the method comprising:

receiving content from a content source;

controlling a display to display the received content;

receiving the control information during the display of the received content, the control information including location information indicating a location of application information, the application information including an application control document;

computing a random time period based on a diffusion attribute included in the received control information;

retrieving the application information using the location information based on a change in the control information after the computed random time period has elapsed;

loading the application control document; and controlling the display in accordance with the application control document.

* * * * *